US012019996B2

(12) United States Patent
Patel et al.

(10) Patent No.: US 12,019,996 B2
(45) Date of Patent: Jun. 25, 2024

(54) CONVERSATIONAL SYNTAX USING CONSTRAINED NATURAL LANGUAGE PROCESSING FOR ACCESSING DATASETS

(71) Applicant: DataChat.ai, Madison, WI (US)

(72) Inventors: Jignesh Patel, Madison, WI (US); Junda Chen, Madison, WI (US); Dylan Paul Bacon, Madison, WI (US); Jiatong Li, Madison, WI (US); Ushmal Ramesh, Madison, WI (US); Rogers Jeffrey Leo John, Middleton, WI (US)

(73) Assignee: DataChat.ai, Madison, WI (US)

( * ) Notice: Subject to any disclaimer, the term of this patent is extended or adjusted under 35 U.S.C. 154(b) by 346 days.

(21) Appl. No.: 17/445,665

(22) Filed: Aug. 23, 2021

(65) Prior Publication Data

US 2022/0067303 A1  Mar. 3, 2022

Related U.S. Application Data

(60) Provisional application No. 63/070,074, filed on Aug. 25, 2020.

(51) Int. Cl.
*G06F 40/40* (2020.01)
*G06F 16/22* (2019.01)
(Continued)

(52) U.S. Cl.
CPC .......... *G06F 40/40* (2020.01); *G06F 16/2282* (2019.01); *G06F 16/3329* (2019.01); *G06F 16/3344* (2019.01); *G06N 20/20* (2019.01)

(58) Field of Classification Search
CPC ........ G06F 40/10; G06F 40/12; G06F 40/151; G06F 40/157; G06F 40/20; G06F 40/206;
(Continued)

(56) References Cited

U.S. PATENT DOCUMENTS 7,657,424 B2 * 2/2010 Bennett ................. G06F 40/216
704/270.1
11,157,704 B2 10/2021 Patel et al.
(Continued)

OTHER PUBLICATIONS

International Search Report and Written Opinion of International Application No. PCT/US2021/071254, dated Nov. 16, 2021, 13pp.
(Continued)

*Primary Examiner* — Richa Sonifrank
*Assistant Examiner* — Alexander Joongie Kim
(74) *Attorney, Agent, or Firm* — Shumaker & Sieffert, P.A.

(57) ABSTRACT

In general, techniques are described for various aspects of accessing datasets. A device comprising a memory configured to store the dataset, and a processor may be configured to perform the techniques. The processor may expose a language sub-surface specifying a natural language containment hierarchy defining a grammar for a natural language as a hierarchical arrangement of a plurality of language sub-surfaces. The processor may receive a query to access the dataset, the query conforming to a portion of the natural language provided by the exposed language sub-surface. The processor may transform the query into one or more statements that conform to a formal syntax associated with the dataset, access, based on the one or more statements, the dataset to obtain a query result, and output the query result.

21 Claims, 21 Drawing Sheets

(51) Int. Cl.
    *G06F 16/33*     (2019.01)
    *G06F 16/332*     (2019.01)
    *G06N 20/20*     (2019.01)

(58) Field of Classification Search
CPC .... G06F 40/211; G06F 40/279; G06F 40/284; G06F 40/289; G06F 40/30; G06F 40/35; G06F 40/40; G06F 16/00; G06F 16/20; G06F 16/24; G06F 16/242; G06F 16/243; G06F 16/245; G06F 16/2452; G06F 16/24522; G06F 16/2453; G06F 16/24534; G06F 16/24535; G06F 16/33; G06F 16/33; G06F 16/332; G06F 16/3325; G06F 16/3326; G06F 16/3329; G06F 16/3344; G06F 16/90; G06F 16/9024; G06F 16/903; G06F 16/9032; G06F 16/90332; G06F 16/90324; G10L 15/08; G10L 15/18; G10L 15/1815
See application file for complete search history.

(56) References Cited

U.S. PATENT DOCUMENTS

| | | | |
|---|---|---|---|
| 11,227,114 B1* | 1/2022 | Yurtsev | G06F 16/3322 |
| 2005/0043940 A1 | 2/2005 | Elder | |
| 2005/0091036 A1* | 4/2005 | Shackleton | G06F 40/211 704/9 |
| 2018/0052842 A1 | 2/2018 | Hewavitharana et al. | |
| 2019/0012390 A1 | 1/2019 | Nishant et al. | |
| 2019/0384815 A1 | 12/2019 | Patel et al. | |

OTHER PUBLICATIONS

International Preliminary Report on Patentability from International Application No. PCT/US2021/071254 dated Mar. 9, 2023, 9 pp.
Response to Communication Pursuant to Rules 161(1) and 162 EPC dated Apr. 4, 2023, from counterpart European Application No. 21770405.5, filed Oct. 4, 2023, 102 pp.

* cited by examiner

FIG. 2A sample
Showing 5 of 7,043 rows

| Customer ID | gender | Senior Citizen | Partner | Dependents | Tenure | PhoneService | MultipleLines | InternetService | OnlineSecurity | Online |
|---|---|---|---|---|---|---|---|---|---|---|
| 1982-FEBTD | Female | 0 | Yes | Yes | 23 | Yes | Yes | No | No internet service | No inte |
| 1984-FCDWB | Female | 0 | Yes | No | 70 | Yes | Yes | Fiber optic | No | Yes |
| 1984-GPTEH | Female | 0 | No | No | 29 | Yes | Yes | No | No internet service | No inte |
| 1985-MBRYP | Female | 0 | No | No | 43 | Yes | No | No | No internet service | No inte |
| 1985-PHGZF | Female | 1 | No | No | 18 | Yes | Yes | DSL | Yes | Yes |

Good morning! I'm Ava, your chat-based data assistant.

Load data from the file telcoCustomerChurn.csv

Done, I've loaded the data from the file. It's now called telcoCustomerChurn. This dataset contains 7,043 rows. Use this dataset.

You can ask me to:
- Describe the dataset current in detail
- Analyze Churn
- Clear recommendations for telcoCustomerChurn Type for suggestions

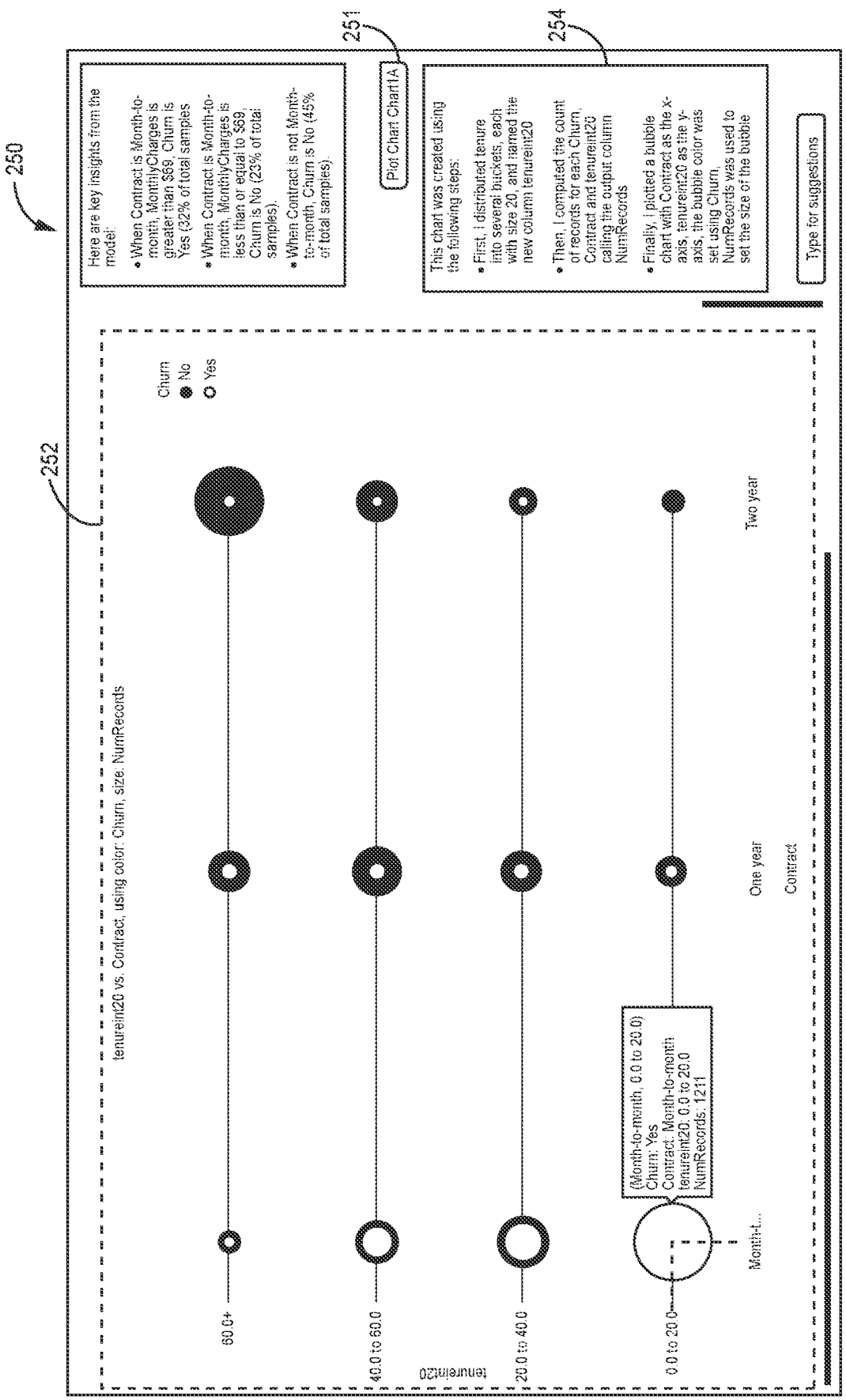

FIG. 3A

*Chat interface showing data assistant "Ava" with loaded dataset "sba" containing 168,182 rows, and filtered result of 3,923 rows where BorrState contains "WI". Callouts 301-304 mark UI elements.*

Chat messages:
- Good morning! I'm Ava, your chat-based data assistant.
- Done, I've loaded the data from the file. It's now called sba. This dataset contains 168,182 rows.
  You can ask me to:
  • Describe the dataset current
  • Compute count of records for each BorrCity, BorrName, BorrState
  • Search USPhoneNumber pattern in UnboundDatasetName(database);
  • Clear recommendations for sba First table sample:

| Program | BorrName | BorrStreet | BorrCity | BorrState | BorrZip | CDCName | CDCStreet | CDCCity | CDCState |
|---|---|---|---|---|---|---|---|---|---|
| 504 | NW Utility Services, LLC | 226 Frontage Road South | Pacific | WA | 98047 | Ameritrust CDC | 17405 76th Ave., W. | Edmonds | WA |
| 504 | Suzanne Merrill Insurance Agen | 11576 S. State St. #1104 | Draper | UT | 84020 | Mountain West Small Business Finance | 2595 East 3300 South | Salt Lake City | UT |
| 504 | Ecocolatgy, Inc. | 17500 Red Hill Ave., Unit 140 | Irvine | CA | 92614 | Southland Economic Development Corporation | 400 N. Tustin Ave | Santa Ana | CA |
| 504 | Brian M. Bivens, D.M.D., M.S. | 12950 Race Track Road #107 | Tampa | FL | 33626 | Florida First Capital Finance Corporation, Inc. | 1351 N. Gadsden | Tallahassee | FL |
| 504 | High View Learning Center inc. | 907 W Holiday Drive | Rockwell | TX | 75087 | Capital Certified Development Corporation | 1250 Capital of Texas Hwy Sout | Austin | TX |

Keep the rows where BarrState contains [WI]

- OK, here's a sample of the result. This dataset contains 3,923 rows.

| Program | BorrName | BorrStreet | BorrCity | BorrState | BorrZip | CDCName | CDCStreet | CDCCity | CDCState | CDCZip | ThirdParty |
|---|---|---|---|---|---|---|---|---|---|---|---|
| 504 | RALLAN PROPERTIES, LLC | 524 WEST STATE STREET | FOX LAKE | WI | 53916 | WBD, Inc. | 4618 Biltmore Lane | Madison | WI | 53718 | null |
| 504 | RIDGEWAY ONE STOP LLC | 8510 US HIGHWAY 45 | NEENAH | WI | 54956 | WBD, Inc. | 4618 Biltmore Lane | Madison | WI | 53718 | null |
| 504 | STARFIRE SYSTEMS INC | 9825 SOUTH 54TH ST. | FRANKLIN | WI | 53132 | WBD, Inc. | 4618 Biltmore Lane | Madison | WI | 53718 | null |
| 504 | CHURCH AND CHAPEL FUNERAL SERV | SECTION 26 TOWNSHIP 7 NORTH | WAUKESHA | WI | 53186 | WBD, Inc. | 4618 Biltmore Lane | Madison | WI | 53718 | null |
| 504 | PRECISION PAPER CONVERTERS LLC | 2800 NORTHRIDGE DRIVE | KAUKAUNA | WI | 54130 | WBD, Inc. | 4618 Biltmore Lane | Madison | WI | 53718 | null |

OK, here's a sample of the result. This dataset contains 3,923 rows.

| BorrCity | BorrState | BorrStreet |
|---|---|---|
| WHITEWATER | WI | 917 E MILWAUKEE ST |
| OAK CREEK | WI | 2500 W. SOUTHBRANCH BLVD. |
| WAUWATOSA | WI | 3000 NORTH 117TH ST. |
| SUSSEX | WI | W226 N6323 VILLAGE DRIVE |
| KENOSHA | WI | HIGHWAY 31 & 52ND STREET |
| KENOSHA | WI | 9244 39TH AVE. |
| KAKAUNA | WI | 1200 MALONEY ROAD |
| MILWAUKEE | WI | 530 N 22ND ST |
| BURLINGTON | WI | 221 FRONT STREET |
| RACINE | WI | 3829 DOUGLAS AVENUE |
| ST. FRANCIS | WI | 1570 EAST BOLIVAR AVENUE |
| SAUK CITY | WI | 855 PHILLIPS BOULEVARD |
| FOX LAKE | WI | 103 INDUSTRIAL DRIVE |
| OAK CREEK | WI | 7764 SOUTH 10TH STREET |
| ST CROIX FALLS | WI | HIGHWAY 8 & 35 |

Keep the columns BorrCity, BorrState, BorrStreet

FIG. 3B

I have used dataset sba to resolve your query.
OK, here's a sample of the result. This dataset contains 56,821 rows.

Keep the rows where ApprovalFiscalYear is greater than 2009 — 315

— 316    — 317

| Program | BorrName | BorrStreet | BorrCity | BorrState | BorrZip | CDCName | CDCStreet | CDCCity |
|---|---|---|---|---|---|---|---|---|
| 504 | Brad L Rondeau, DDS, PC | 7800 Grand River Ave. Suite 2 | Brighton | MI | 48114 | Michigan Certified Development Corporation | 3737 Coolidge Road, 2nd Floor | East Lansing |
| 504 | Green Screen Downtown LLC | 214 West 14th Street | Los Angeles | CA | 90015 | Mortgage Capital Development Corporation | 1720 Broadway | Oakland |
| 504 | Skagit Shooting Range LLC | 1340 Bouslog Road | Burlington | WA | 98233 | Evergreen Business Capital | 13925 Interurban Ave. S | Seattle |
| 504 | Priority Supply, Inc. | 1965 Waldorf NW. | Alpine Township | MI | 49544 | Economic Development Foundation Certified | 1345 MONROE Ave. NW | GRAND RAPIDS |
| 504 | Southland on Kalamazoo, LLC | 670 Kalamazoo Avenue SE. | Gaines Township | MI | 49316 | Economic Development Foundation Certified | 1345 MONROE Ave. NW | GRAND RAPIDS |

FIG. 3C

| | |
|---|---|
| Compute count of records, total GrossApproval, total GrossChargeOffAmount, maximum GrossApproval for each ApprovalFiscalYear, BorrState calling the output columns NumberOfLoansMade, TotalApproved, TotalLost, MaximumLoan | |
| I used the dataset named sba to answer this query. If you meant to use the dataset sba_sample, please switch to them first by invoking the "Use" skill. Here's a sample of the date. This dataset contains 1,424 rows. | ☐ |

| ApprovalFiscalYear | BorrState | NumberOfLoansMade | TotalApproved | TotalLost | MaximumLoan |
|---|---|---|---|---|---|
| 2017 | WY | 12 | 7,452,000 | 0 | 2,587,000 |
| 2017 | WV | 2 | 472,000 | 0 | 269,000 |
| 2017 | WI | 191 | 150,725,000 | 0 | 5,111,000 |
| 2017 | WA | 120 | 112,292,000 | 0 | 5,000,000 |
| 2017 | VT | 15 | 9,289,000 | 0 | 2,291,000 |
| 2017 | VA | 121 | 81,681,000 | 0 | 5,000,000 |
| 2017 | UT | 214 | 159,677,000 | 0 | 5,207,000 |
| 2017 | TX | 253 | 279,572,000 | 0 | 5,500,000 |
| 2017 | TN | 17 | 8,465,000 | 0 | 975,000 |
| 2017 | SD | 66 | 29,529,000 | 0 | 2,628,000 |

FIG. 3D

OK, here's a sample of the result. This dataset contains 84,078 rows

Keep the rows where GrossApproval is less than the aggregate value median GrossApproval

| Program | BorrName | BorrStreet | BorrCity | BorrState | BorrZip | CDCName | CDCStreet | CDCCity |
|---|---|---|---|---|---|---|---|---|
| 504 | KNOWLEDGE STREAM, INC. | 820 16TH ST STE 615 | DENVER | CO | 80202 | Colorado Lending Source, Ltd. | 1441 18th Street | Denver |
| 504 | NEWELL'S BOAT WORKS, INC. | 105 CONSTITUTION AVENUE | PORTSMOUTH | VA | 23703 | Tidewater Business Financing Corporation | 501 Independence Parkway | Chesapeake |
| 504 | PHYZIQEUST VITALITY ENTERPRIZE | 407 N SAN MATEO DRIVE | SAN MATEO | CA | 94401 | Bay Area Employment Development Company | 1801 Oakland Boulevard | Walnut Creek |
| 504 | AL'S SHORT STOP | 908 S. DEL DIOS HWY | ESCONDIDO | CA | 92025 | CDC Small Business Finance Corporation | 2448 Historic Decatur | San Diego |
| 504 | TOOKY MILLS PUB, LLC | 9 DEPOT STREET | HILLSBORO | NH | 33244 | Granite State Economic Development Corporation | One Gate Street | Portsmouth |

FIG. 3E

OK, here's a sample of the result. This dataset contains 891 rows.

| Passengerid | Survived | Pclass | Name | Gender | Age | SibSp | Parch | Ticket | Fare | Cabin | Embarked | TestWindow |
|---|---|---|---|---|---|---|---|---|---|---|---|---|
| 452 | 0 | 3 | Hagland, Mr. Ingvald Olai Olsen | male | null | 1 | 0 | 65303 | 19.97 | null | S | 13.4 |
| 455 | 0 | 3 | Peduzzi, Mr. Joseph | male | null | 0 | 0 | A/5 2817 | 8.05 | null | S | 11.81 |
| 458 | 1 | 1 | Kenyon, Mrs. Frederick R (Marion) | female | null | 1 | 0 | 17464 | 51.88 | D21 | S | 11.82 |
| 460 | 0 | 3 | O'Connor, Mr. Maurice | male | null | 0 | 0 | 371060 | 7.75 | null | Q | 11.3 |
| 389 | 0 | 3 | Sadlier, Mr. Matthew | male | null | 0 | 0 | 367655 | 7.73 | null | Q | 11.3 |

Create a new window column TestWindow as average Fare computed over rows 10 before 3 after for each Parch sorted by Age

FIG. 3F

CONVERSATIONAL SYNTAX USING CONSTRAINED NATURAL LANGUAGE PROCESSING FOR ACCESSING DATASETS

This application claims priority to U.S. Provisional Application No. 63/070,074, entitled "MACHINE LEARNING MODEL SELECTION AND EXPLANATION FOR MULTI-DIMENSIONAL DATASETS AND CONVERSATIONAL SYNTAX USING CONSTRAINED NATURAL LANGUAGE PROCESSING FOR ACCESSING DATASETS," filed Aug. 25, 2020, the contents of which are hereby incorporated by reference as if set out in their entirety herein.

TECHNICAL FIELD

This disclosure relates to computing and data analytics systems, and more specifically, systems using natural language processing.

BACKGROUND

Natural language processing generally refers to a technical field in which computing devices process user inputs provided by users via conversational interactions using human languages. For example, a device may prompt a user for various inputs, present clarifying questions, present follow-up questions, or otherwise interact with the user in a conversational manner to elicit the input. The user may likewise enter the inputs as sentences or even fragments, thereby establishing a simulated dialog with the device to specify one or more intents (which may also be referred to as "tasks") to be performed by the device.

During this process the device may present various interfaces by which to present the conversation. An example interface may act as a so-called "chatbot," which often is configured to attempt to mimic human qualities, including personalities, voices, preferences, humor, etc. in an effort to establish a more conversational tone, and thereby facilitate interactions with the user by which to more naturally receive the input. Examples of chatbots include "digital assistants" (which may also be referred to as "virtual assistants"), which are a subset of chatbots focused on a set of tasks dedicated to assistance (such as scheduling meetings, make hotel reservations, and schedule delivery of food).

There are a number of different natural language processing algorithms utilized to parse the inputs to identify intents, some of which depend upon machine learning. However, natural languages often do not follow precise formats, and various users may have slightly different ways of expressing inputs that result in the same general intent, resulting in so-called "edge cases" that many natural language algorithms, including those that depend upon machine learning, are not programed (or, in the context of machine language, trained) to specifically address.

SUMMARY

In general, this disclosure describes techniques for constrained natural language processing (CNLP) that expose language sub-surfaces in a constrained manner, thereby removing ambiguity and aiding discoverability. In general, a natural language surface refers to the permitted set of potential user inputs (e.g., utterances), i.e., the set of utterances that the natural language processing system is capable of correctly processing.

Various aspects of the techniques are described by which to access datasets, including multi-dimensional datasets having two or more dimensions (e.g., rows and/or columns), using CNLP. Rather than require users to understand formal (and, often, rigid) syntaxes employed by formal databases, such as sequential query language—SQL, Pandas, and other database programming languages—various aspects of the techniques may enable a device to provide an interface by which less formal, more conversational queries may be received and processed to retrieve data from datasets that meet certain requirements. The device may transform the informal, more conversational queries into formal statements that adhere to the formal syntax associated with the datasets.

Facilitating such access to datasets may enable users to more efficiently operate devices used to retrieve relevant data (in terms of relevance to queries). The efficiencies may occur as a result of not having to process additional commands or operations in a trial-and-error approach while also ensuring adequate confidence in query results, as the device(s) may augment or otherwise transform query results into results that include an explanation of query results in plain language.

As fewer attempts to access datasets may occur as a result of such transformations, the devices may operate more efficiently. That is, the devices may receive fewer queries in order to successfully access databases to provide results that may potentially result in less consumption of resources, such as processor cycles, memory, memory bandwidth, etc., and thereby result in less power consumption.

Further, the devices may determine a correlation of one or more dimensions (e.g., a selected row or column) of the multi-dimensional datasets stored to the databases to query results provided in response to transformed queries output by machine learning models (MLMs). The device may invoke multiple MLMs responsive to queries that analyze query results resulting from accessing the datasets to obtain results. Based on the determined correlation, the device may select one or more of MLM to obtain result (e.g., selecting an MLM having the determined correlation above a threshold correlation as one or more sources of the result). The device may output results for each of the one or more of MLMs, which may output the result.

The devices may determine a sentence in plain language explaining why one or more of MLM were selected, utilizing the determined correlation to facilitate generation and/or determination of the sentence. The device may include the sentence explaining why one or more of MLM were selected as part of the results, thereby potentially enabling users to better trust the result. Such trust may enable users, whether an experienced data scientist or a new user, to gain confidence in the result such that the user may reduce a number of interactions with the device.

Again, as fewer attempts to access the databases may occur as a result of such explanation, the device may operate more efficiently. That is, the device(s) may receive fewer queries in order to successfully access databases to provide results that may, again, potentially result in less consumption of resources, such as processor cycles, memory, memory bandwidth, etc., and thereby result in less power consumption.

In one example, various aspects of the techniques are directed to a device configured to interpret a multi-dimensional dataset, the device comprising: a memory configured to store the multi-dimensional dataset; and one or more processors configured to: apply a plurality of machine learning models to the multi-dimensional dataset to obtain a result output by each of the plurality of machine learning models; determine a correlation of one or more dimensions of the multi-dimensional dataset to the results output by each of the plurality of machine learning models; select, based on the correlation determined between the one or more dimensions and the result output by each of the plurality of machine learning models, a subset of the plurality of machine learning models to obtain the result for each of the subset of the plurality of machine learning models; and output the result for each of the subset of the plurality of machine learning models.

In another example, various aspects of the techniques are directed to a method of interpreting a multi-dimensional dataset, the method comprising: applying a plurality of machine learning models to the multi-dimensional dataset to obtain a result output by each of the plurality of machine learning models; determining a correlation of the one or more dimensions of the multi-dimensional dataset to the results output by each of the plurality of machine learning models; selecting, based on the correlation determined between the one or more dimensions and the result output by each of the plurality of machine learning models, a subset of the plurality of machine learning models to obtain the result for each of the subset of the plurality of machine learning models; and outputting the result for each of the subset of the plurality of machine learning models.

In another example, various aspects of the techniques are directed to a non-transitory computer-readable storage medium storing instructions that, when executed, cause one or more processors to: apply a plurality of machine learning models to a multi-dimensional dataset to obtain a result output by each of the plurality of machine learning models; determine a correlation of the one or more dimensions of the multi-dimensional dataset to the result output by each of the plurality of machine learning models; select, based on the correlation determined between the one or more dimensions and the result output by each of the plurality of machine learning models, a subset of the plurality of machine learning models to obtain the result for each of the subset of the plurality of machine learning models; and output the result for each of the subset of the plurality of machine learning models.

In another example, various aspects of the techniques are directed to a device configured to access a dataset, the device comprising: a memory configured to store the dataset; and one or more processors configured to: expose a language sub-surface specifying a natural language containment hierarchy defining a grammar for a natural language as a hierarchical arrangement of a plurality of language sub-surfaces; receive a query to access the dataset, the query conforming to a portion of the natural language provided by the exposed language sub-surface; transform the query into one or more statements that conform to a formal syntax associated with the dataset; access, based on the one or more statements, the dataset to obtain a query result; and output the query result.

In another example, various aspects of the techniques are directed to a method of accessing a dataset, the method comprising: exposing a language sub-surface specifying a natural language containment hierarchy defining a grammar for a natural language as a hierarchical arrangement of a plurality of language sub-surfaces; receiving a query to access the dataset, the query conforming to a portion of the language provided by the exposed language sub-surface; transforming the query into one or more statements that conform to a formal syntax associated with the dataset; accessing, based on the one or more statements, the dataset to obtain a query result; and outputting the query result.

In another example, various aspects of the techniques are directed to a non-transitory computer-readable storage medium storing instructions that, when executed, cause one or more processors to: expose a language sub-surface specifying a natural language containment hierarchy defining a grammar for a natural language as a hierarchical arrangement of a plurality of language sub-surfaces; receive a query to access a dataset, the query conforming to a portion of the language provided by the exposed language sub-surface; transform the query into one or more statements that conform to a formal syntax associated with the dataset; access, based on the one or more statements, the dataset to obtain a query result; and output the query result.

The details of one or more aspects of the techniques are set forth in the accompanying drawings and the description below. Other features, objects, and advantages of these techniques will be apparent from the description and drawings, and from the claims.

BRIEF DESCRIPTION OF DRAWINGS

FIGS. 2A-2I are diagrams illustrating an example interface presented by the interface unit of the host device shown in FIG. 1 that includes a number of different applications executed by the execution platforms of the host device.

FIGS. 3A-3G are diagrams illustrating interfaces presented by the interface unit of the host device shown in FIG. 1 that facilitate sales manager productivity analytics via the sales manager productivity application shown in FIG. 2 in accordance with various aspects of the CNLP techniques described in this disclosure.

DETAILED DESCRIPTION

Figure 1:
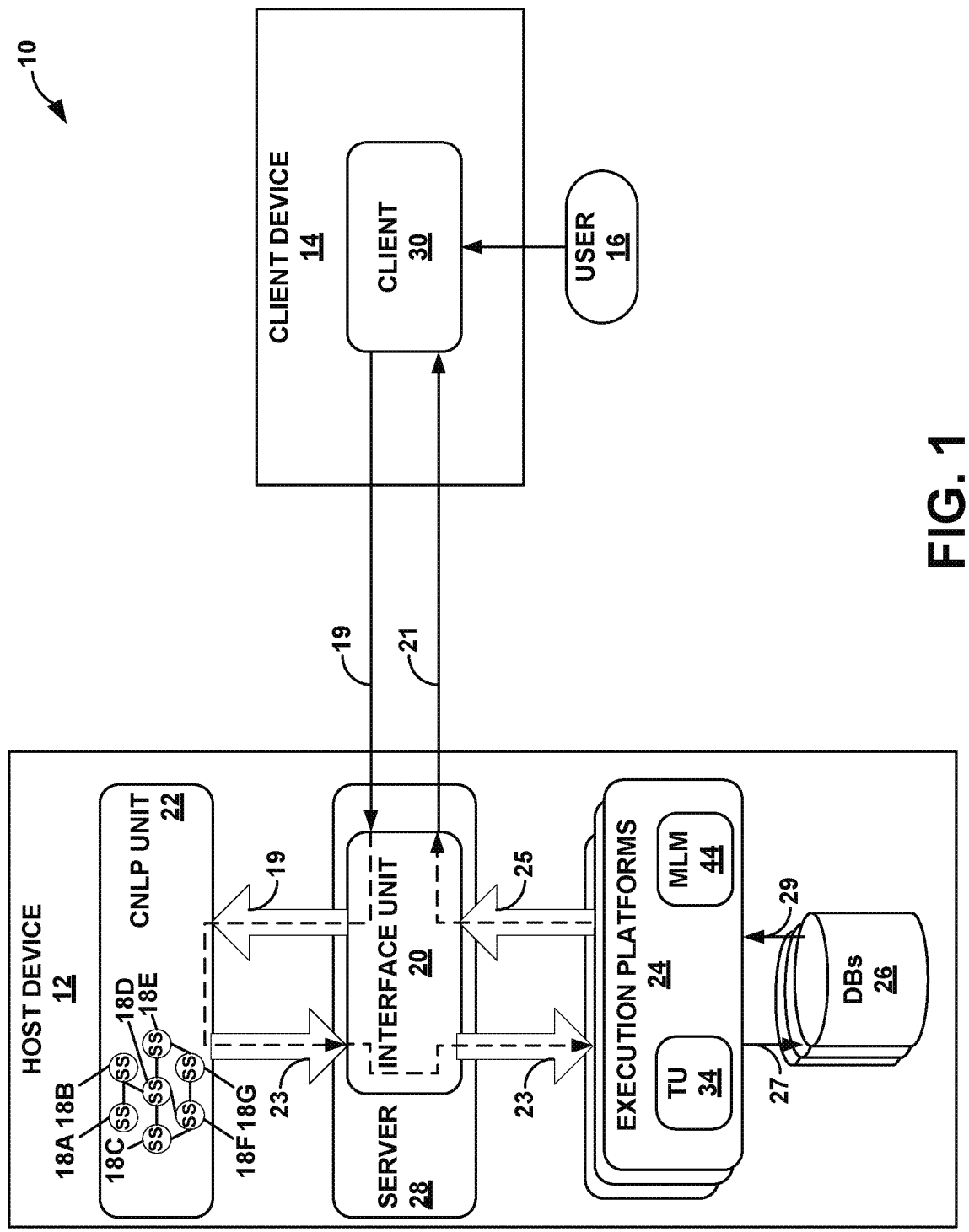
FIG. 1 is a block diagram illustrating a system that may perform various aspects of the techniques described in this disclosure.

FIG. 1 is a diagram illustrating a system 10 that may perform various aspects of the techniques described in this disclosure for constrained natural language processing (CNLP). As shown in the example of FIG. 1, system 10 includes a host device 12 and a client device 14. Although shown as including two devices, i.e., host device 12 and client device 14 in the example of FIG. 1, system 10 may include a single device that incorporates the functionality described below with respect to both of host device 12 and client device 14, or multiple clients 14 that each interface with one or more host devices 12 that share a mutual database hosted by one or more of the host devices 12.

Host device 12 may represent any form of computing device capable of implementing the techniques described in this disclosure, including a handset (or cellular phone), a tablet computer, a so-called smart phone, a desktop computer, and a laptop computer to provide a few examples. Likewise, client device 14 may represent any form of computing device capable of implementing the techniques described in this disclosure, including a handset (or cellular phone), a tablet computer, a so-called smart phone, a desktop computer, a laptop computer, a so-called smart speaker, so-called smart headphones, and so-called smart televisions, to provide a few examples.

As shown in the example of FIG. 1, host device 12 includes a server 28, a CNLP unit 22, one or more execution platforms 24, and a database 26. Server 28 may represent a unit configured to maintain a conversational context as well as coordinate the routing of data between CNLP unit 22 and execution platforms 24.

Server 28 may include an interface unit 20, which may represent a unit by which host device 12 may present one or more interfaces 21 to client device 14 in order to elicit data 19 indicative of an input and/or present results 25. Data 19 may be indicative of speech input, text input, image input (e.g., representative of text or capable of being reduced to text), or any other type of input capable of facilitating a dialog with host device 12. Interface unit 20 may generate or otherwise output various interfaces 21, including graphical user interfaces (GUIs), command line interfaces (CLIs), or any other interface by which to present data or otherwise provide data to a user 16. Interface unit 20 may, as one example, output a chat interface 21 in the form of a GUI with which the user 16 may interact to input data 19 indicative of the input (i.e., text inputs in the context of the chat server example). Server 28 may output the data 19 to CNLP unit 22 (or otherwise invoke CNLP unit 22 and pass data 19 via the invocation).

CNLP unit 22 may represent a unit configured to perform various aspects of the CNLP techniques as set forth in this disclosure. CNLP unit 22 may maintain a number of interconnected language sub-surfaces (shown as "SS") 18A-18G ("SS 18"). Language sub-surfaces 18 may collectively represent a language, while each of the language sub-surfaces 18 may provide a portion (which may be different portions or overlapping portions) of the language. Each portion may specify a corresponding set of syntax rules and strings permitted for the natural language with which user 16 may interface to enter data 19 indicative of the input. CNLP unit 22 may, as described below in more detail, perform CNLP, based on the language sub-surfaces 18 and data 19, to identify one or more intents 23. CNLP unit 22 may output the intents 23 to server 28, which may in turn invoke one of execution platforms 24 associated with the intents 23, passing the intents 23 to one of the execution platforms 24 for further processing.

Execution platforms 24 may represent one or more platforms configured to perform various processes associated with the identified intents 23. The processes may each perform a different set of operations with respect to, in the example of FIG. 1, databases 26. In some examples, execution platforms 24 may each include processes corresponding to different categories, such as different categories of data analysis including sales data analytics, health data analytics, or loan data analytics, different forms of machine learning, etc. In some examples, execution platforms 24 may perform general data analysis that allows various different combinations of data stored to databases 26 to undergo complex processing and display via charts, graphs, etc. Execution platforms 24 may process the intents 23 to obtain results 25, which execution platforms 24 may return to server 28. Interface unit 20 may generate a GUI 21 that present results 25, transmitting the GUI 21 to client device 14.

In this respect, execution platforms 24 may generally represent different platforms that support applications to perform analysis of underlying data stored to databases 26, where the platforms may offer extensible application development to accommodate evolving collection and analysis of data or perform other tasks/intents. For example, execution platforms 24 may include such platforms as Postgres (which may also be referred to as PostgreSQL, and represents an example of a relational database that performs data loading and manipulation), TensorFlow™ (which may perform machine learning in a specialized machine learning engine), and Amazon Web Services (or AWS, which performs large scale data analysis tasks that often utilize multiple machines, referred to generally as the cloud).

The client device 14 may include a client 30 (which may in the context of a chatbot interface be referred to as a "chat client 30"). Client 30 may represent a unit configured to present interface 21 and allow entry of data 19. Client 30 may execute within the context of a browser, as a dedicated third-party application, as a first-party application, or as an integrated component of an operating system (not shown in FIG. 1) of client device 14.

Returning to natural language processing, CNLP unit 22 may perform a balanced form of natural language processing compared to other forms of natural language processing. Natural language processing may refer to a process by which host device 12 attempts to process data 19 indicative of inputs (which may also be referred to as "inputs 19" or, in other words, "queries 19" for ease of explanation purposes) provided via a conversational interaction with client device 14. Host device 12 may dynamically prompt user 16 for various inputs 19, present clarifying questions, present follow-up questions, or otherwise interact with the user in a conversational manner to elicit input 19. User 16 may likewise enter the inputs 19 as sentences or even fragments, thereby establishing a simulated dialog with host device 12 to identify one or more intents 23 (which may also be referred to as "tasks 23").

Host device 12 may present various interfaces 21 by which to present the conversation. An example interface may act as a so-called "chatbot," which may attempt to mimic human qualities, including personalities, voices, preferences, humor, etc. in an effort to establish a more conversational tone, and thereby facilitate interactions with the user by which to more naturally receive the input. Examples of chatbots include "digital assistants" (which may also be referred to as "virtual assistants"), which are a subset of chatbots focused on a set of tasks dedicated to assistance (such as scheduling meetings, make hotel reservations, and schedule delivery of food).

A number of different natural language processing algorithms exist to parse the inputs 19 to identify intents 23, some of which depend upon machine learning. However, natural language may not always follow a precise format, and various users may have slightly different ways of expressing inputs 19 that result in the same general intent 23, some of which may result in so-called "edge cases" that many natural language algorithms, including those that depend upon machine learning, are not programed (or, in the context of machine learning, trained) to specifically address such edge cases. Machine learning based natural language processing may value naturalness over predictability and precision, thereby encountering edge cases more frequently when the trained naturalness of language differs from the user's perceived naturalness of language. Such edge cases can sometimes be identified by the system and reported as an inability to understand and proceed, which may frustrate the user. On the other hand, it may also be the case that the system proceeds with an imprecise understanding of the user's intent, causing actions or results that may be undesirable or misleading.

Other types of natural language processing algorithms utilized to parse inputs 19 to identify intents 23 may rely on keywords. While keyword based natural language processing algorithms may be accurate and predictable, keyword based natural language processing algorithms are not precise in that keywords do not provide much if any nuance in describing different intents 23.

In other words, various natural language processing algorithms fall within two classes. In the first class, machine learning-based algorithms for natural language processing rely on statistical machine learning processes, such as deep neural networks and support vector machines. Both of these machine learning processes may suffer from limited ability to discern nuances in the user utterances. Furthermore, while the machine learning based algorithms allow for a wide variety of natural-sounding utterances for the same intent, such machine learning based algorithms can often be unpredictable, parsing the same utterance differently in successive versions, in ways that are hard for developers and users to understand. In the second class, simple keyword-based algorithms for natural language processing may match the user's utterance against a predefined set of keywords and retrieve the associated intent.

CNLP unit 22 may parse inputs 19 (which may, as one example, include natural language statements that may also be referred to as "utterances") in a manner that balances accuracy, precision, and predictability. CNLP unit 22 may achieve the balance through various design decisions when implementing the underlying language surface (which is another way of referring to the collection of sub-surfaces 18, or the "language"). Language surface 18 may represent a set of potential user utterances for which server 28 is capable of parsing (or, in more anthropomorphic terms, "understanding") the intent of the user 16.

The design decisions may negotiate a tradeoff between competing priorities, including accuracy (e.g., how frequently server 28 is able to correctly interpret the utterances), precision (e.g., how nuanced the utterances can be in expressing the intent of user 16), and naturalness (e.g., how diverse the various phrasing of an utterance that map to the same intent of user 16 can be). The CNLP techniques may allow CNLP unit 22 to unambiguously parse inputs 19 (which may also be denoted as the "utterances 19"), thereby potentially ensuring predictable, accurate parsing of precise (though constrained) natural language utterances 19.

In operation, CNLP unit 22 may expose, to an initial user (which user 16 may be assumed to be for purposes of illustration) a select one of language sub-surfaces 18 in a constrained manner, potentially only exposing the select one of the language sub-surfaces 18. CNLP unit 22 may receive via interface unit 20 input 19 that conforms with the portion of the language provided by the exposed language sub-surface, and process input 19 to identify intent 23 of user 16 from a plurality of intents 23 associated with the language. That is, when designing CNLP unit 22 in support of server 28, a designer may select a set of intents 23 that the server 28 supports (in terms of supporting parsing of input 19 via CNLP unit 22).

Further, CNLP unit 22 may optionally increase precision with respect to each of intents 23 by supporting one or more entities. To illustrate, consider an intent of scheduling a meeting, which may have entities, such as a time and/or venue associated with the meeting scheduling intent, a frequency of repetition of each of the meeting scheduling intent (if any), and other participants (if any) to the schedule meeting intent. CNLP unit 22 may perform the process of parsing to identify that utterance 19 belongs to a certain one of the set of intents 23, and thereafter to extra any entities that may have occurred in the utterance 19.

CNLP unit 22 may associate each of intents 23 provided by the language 18 with one or more patterns. Each pattern supported by CNLP unit 22 may include one or more of the following components:

a) A non-empty set of identifiers that may be present in the utterance for it to be parsed as belonging to this intent. Each identifier may be associated with one or more synonyms whose presence is treated equivalently to the presence of the identifier;

b) An optional set of positional entities which CNLP unit 22 may parse based on where the positional entities occur in the utterance, relative to the identifiers;

c) An optional set of keyword entities, each associated with a keyword (and possibly synonyms thereof). These keyword entities may occur anywhere in the utterance relative to each other; instead of their position, the keyword entities are parsed based on the occurrence of the associated keyword nearby (either before or after) in the utterance;

d) An optional set of prepositional phrase entities, each associated with one or more prepositions (which may include terms such as "for each"). These propositional phrase entities may be parsed based on the occurrence of the corresponding prepositional phrase;

e) A set of ignored words, which may refer to words that occur commonly in natural language or otherwise carry little utility to interpreting the utterance, such as "the," "a," etc.;

f) A prompt optionally associated with each entity, providing both a description of the entity, as well as a statement that CNLP unit 22 may use to query user 16 and elicit a value for the entity when the value may not be parsed from the utterance; and g) A pattern statement describing a relative order in which the identifiers and entities may occur in the pattern.

As an example, consider that in order to schedule a meeting, CNLP unit 22 may define a pattern as follows. The identifiers may be "schedule" and "meeting", where the word "meeting" may have a synonym "appointment." CNLP unit 22 may capture a meeting frequency as a positional entity from input 19 occurring in the form "schedule a daily meeting" or "schedule a weekly appointment." Such statements may instead be captured as a keyword entity (with keyword "frequency") as in "schedule a meeting at daily frequency" or "schedule an appointment with frequency weekly." CNLP unit 22 may use a prepositional phrase to parse the timing using the preposition "at" as in "I want to schedule the meeting at 5 PM" or "schedule an appointment at noon."

The above examples included a number of words that CNLP unit 22 may be programmed to ignore when parsing, including "a", "an", "the", "I", "want", "to" etc. The timing entity may also include a prompt such as "At what time would you like to have the meeting?," where server 28 may initiate a query asking user 16 if they did not specify a timing in utterance 19. The pattern statement may describe that this pattern requires the identifier "schedule" to occur before "meeting" (or its synonym "appointment") as well as all other entities.

As such, CNLP unit 22 may process input 19 to identify a pattern from a plurality of patterns associated with the language 18, each of the plurality of patterns associated with a different one of the plurality of intents 23. CNLP unit 22 may then identify, based on the identified pattern, intent 23 of user 16 from the plurality of intents associated with the portion of the language.

The pattern may, as noted above include an identifier. To identify the pattern, CNLP unit 22 may parse input 19 to identify the identifier, and then identify, based on the identifier, the pattern. The pattern may include both the identifier and a positional entity. In these instances, CNLP unit 22 may parse input 19 to identify the positional entity, and identify, based on the identifier and the positional identity, the pattern.

Additionally, the pattern may, as noted above, include a keyword. CNLP unit 22 may parse input 19 to identify the keyword, and then identify, based on the keyword, the pattern in the manner illustrated in the examples below.

The pattern may, as noted above, include an entity. When the pattern includes an entity, CNLP unit 22 may determine that input 19 corresponds to the pattern but does not include the entity. CNLP unit 22 may interface with interface unit 22 to output, based on the determination that input 19 corresponds to the pattern but does not include the entity, a prompt via an interface 21 requesting data indicative of additional input specifying the entity. User 16 may enter data 19 indicative of the additional input (which may be denoted for ease of expression as "additional input 19") specifying the entity. Interface unit 22 may receive the additional input 19 and pass the additional input 19 to CNLP unit 22, which may identify, based on the input 19 and additional input 19, the pattern.

CNLP unit 22 may provide a platform by which to execute pattern parsers to identify different intents 23. The platform provided by CNLP unit 22 may be extensible allowing for development, refinement, addition or removal of pattern parsers. CNLP unit 22 may utilize entity parsers imbedded in the pattern parsers to extract various entities. When various entities are not specified in input 19, CNLP unit 22 may invoke prompts, which are also embedded in the pattern parses. CNLP unit 22 may receive, responsive to outputting the prompts, additional inputs 19 specifying the unspecified entities, and thereby parse input 19 to identify patterns, which may be associated with intent 23.

In this way, CNLP unit 22 may parse various inputs 19 to identify intent 23. CNLP unit 22 may provide intent 23 to server 28, which may invoke one or more of execution platforms 26, passing the intent 23 to the execution platforms 26 in the form of a pattern and associated entities, keywords, and the like. The invoked ones of execution platforms 26 may execute a process associated with intent 23 to perform an operation with respect to corresponding ones of databases 26 and thereby obtain result 25. The invoked ones of execution platforms 26 may provide result 25 (of performing the operation) to server 28, which may provide result 25, via interface 21, to client device 14 interfacing with host device 12 to enter input 19.

Associated with each pattern may be a function (i.e., a procedure) that can identify whether that pattern is to be exposed to the user at this point in the current user session. For instance, a "plot_bubble_chart" pattern may be associated with a procedure that determines whether there is at least one dataset previously loaded by the user (possibly using the "load_data_from_file" pattern, or a "load_data_from_database" pattern that works similarly but loads data from a database instead of a file). When such a procedure is associated with every data visualization pattern in the system (such as "plot_histogram" and "plot_line_chart", etc.), the data visualization patterns may be conceptualized as forming a language sub-surface.

Because these patterns are only exposed when using one of the data loading patterns (which form another language sub-surface), the CNLP unit 22 may effectively link language sub-surfaces to each other. Because the user is only able to execute an utterance belonging to the data visualization language sub-surface after the above prerequisite has been met, the user is provided structure with regard to a so-called "thought process" in executing tasks of interest, allowing the user to (naturally) discover the capabilities of the system in a gradual manner, and reducing cognitive overhead during the discovery process.

As such, CNLP unit 22 may promote better operation of host device 12 that interfaces with user 16 according to a natural language interface, such as so-called "digital assistants" or "chatbots." Rather than consume processing cycles attempting to process ambiguous inputs from which multiple different meanings can be parsed, and presenting follow-up questions to ascertain the precise meaning the user intended by the input, CNLP unit 22 may result in more efficient processing of input 19 by limiting the available language to one or more sub-surfaces 18. The reduction in processing cycles may improve the operation of host device 12 as less power is consumed, less state is generated resulting in reduced memory consumption and less memory bandwidth is utilized (both of which also further reduce power consumption), and more processing bandwidth is preserved for other processes.

CNLP unit 22 may introduce different language sub-surfaces 18 through autocomplete, prompts, questions, or dynamic suggestion mechanisms, thereby exposing the user to additional language sub-surfaces in a more natural (or, in other words, conversational) way. The natural exploration that results through linked sub-surfaces may promote user acceptability and natural learning of the language used by the CNLP techniques, which may avoid frustration due to frequent encounters with edge cases that generally appear due to user inexperience through inadequate understanding of the language by which the CNLP techniques operate. In this sense, the CNLP techniques may balance naturalness, precision and accuracy by naturally allowing a user to expose sub-surfaces utilizing a restricted unambiguous portion of the language to allow for precision and accuracy in expressing intents that avoid ambiguous edge cases.

For example, consider a chatbot designed to perform various categories of data analysis, including loading and cleaning data, slicing and dicing it to answer various business-relevant questions, visualizing data to recognize patterns, and using machine learning techniques to project trends into the future. Using the techniques described herein, the designers of such a system can specify a large language surface that allows users to express intents corresponding to these diverse tasks, while potentially constraining the utterances to only those that can be unambiguously understood by the system, thereby avoiding the edge-cases. Further, the language surface can be tailored to ensure that, using the auto-complete mechanism, even a novice user can focus on the specific task they want to perform, without being overwhelmed by all the other capabilities in the system. For instance, once the user starts to express their intent to plot a chart summarizing their data, the system can suggest the various chart formats from which the user can make their choice. Once the user selects the chart format (e.g., a line chart), the system can suggest the axes, colors and other options the user can configure.

The system designers can specify language sub-surfaces (e.g., utterances for data loading, for data visualization, and for machine learning), and the conditions under which they would be exposed to the user. For instance, the data visualization sub-surface may only be exposed once the user has loaded some data into the system, and the machine learning sub-surface may only be exposed once the user acknowledges that they are aware of the subtleties and pitfalls in building and interpreting machine learning models. That is, this process of gradually revealing details and complexity in the natural language utterances extends both across language sub-surfaces as well as within it.

Taken together, the CNLP techniques can be used to build systems with user interfaces that are easy-to-use (e.g., possibly requiring little training and limiting cognitive overhead), while potentially programmatically recognizing a large variety of intents with high precision, to support users with diverse needs and levels of sophistication. As such, these techniques may permit novel system designs achieving a balance of capability and usability that is difficult or even impossible otherwise. More information regarding CNLP techniques can be found in U.S. application Ser. No. 16/441,915, entitled "CONSTRAINED NATURAL LANGUAGE PROCESSING," filed Jun. 14, 2019, the entire contents of which are hereby incorporated by reference as if set for in its entirety.

In the context of these CNLP techniques, various queries 19 may require interfacing with one or more databases 26 that adhere to a formal syntax. For example, one or more of databases 26 may represent a sequential query language (SQL) database that has a formal syntax (known by the acronym SQL that was formally referred to as SEQUEL) for accessing data stored to the database 26. As another example, one or more of databases 26 may represent a so-called Pandas dataframe accessible via a formal Pandas syntax. Such formal syntaxes may limit accessibility to databases 26 whether user 16 is a less experienced user or an experienced data scientists. Requiring user 16 to understand and correctly define queries 19 using appropriate commands in accordance with the formal syntax may contravene the accessible nature of the CNLP techniques discussed above.

In addition, server 28 may output results 25 obtained via application of machine learning models to multi-dimensional data stored by databases 26. That is, one or more of execution platforms 24 may implement a machine learning model, which are shown as machine learning model (MLM) 44 in the example of FIG. 1. In some instances, MLM 44 are trained using training data to produce a trained model able to generalize properties of data based on similar patterns with the training data. Training MLM 44 may involve learning model parameters by optimizing an objective function, thus optimizing a likelihood of observing the training data given the model. Given variabilities in the training data, the extent of training samples within the training data, and other limitations to training, and the complexity of modern machine learning models, it is often difficult to explain results 25 that appear erratic or fail to meet expectations particularly using plain language that less experienced users (represented by user 16 in some instances) can understand.

In accordance with various aspects of the techniques described in this disclosure, server 28 may receive a query 19 via CNL sub-surface 18 exposed by CNLP unit 22 via interface 21 that includes a plain language request for data stored to databases 26. Such queries 19 may, in other words, request access to databases 26 so as to retrieve data stored to the databases 26 as a dataset. As noted above, such queries 26 may conform to a plain conversational language having various inputs that are translated, by CNLP unit 22, into intents 23. Server 28 may redirect intents 23 to execution platforms 24 that apply transformations to the intents 23 that transform intents 23 (representative of queries 19) into one or more statements 27 that conform to a formal syntax associated with the dataset stored to databases 26. Execution platforms 24 may access, based on statements 27, the dataset stored to databases 27 to obtain a query result 29 providing portions of the dataset relevant to initial queries 19. Execution platforms 24 may obtain query result 29 that execution platforms 24 may use when forming results 25.

As such, host device 12 may maintain the accessibility of the foregoing CNLP techniques in terms of allowing user 16 to define queries 19 in plain conversational language and thereby potentially avoid user 16 from having to have a broad understanding of the formal syntax of SQL, Pandas, or other formal database syntax. In this manner, both experienced data scientists and new users with little data science experience (or training) may access complicated datasets having formal (or, in other words) rigid syntax using plain language. Facilitating such access to datasets may enables user 16 to more efficiently operate client device 14 and host device 12 to retrieve relevant data (in terms of relevance to queries 19). The efficiencies may occur as a result of not having to process additional commands or operations in a trail-and-error approach while also ensuring adequate confidence in query results 29, as execution platforms 24 may augment or otherwise transform query results 29 into results 25 that include an explanation of query results 29 in plain language.

As fewer attempts to access databases 26 may occur as a result of such transformations, both client device 14 and host device 12 may operate more efficiently. That is, client device 14 and host device 12 may receive fewer queries 19 in order to successfully access databases 26 to provide results 25 that may potentially result in less consumption of resources, such as processor cycles, memory, memory bandwidth, etc., and thereby result in less power consumption.

Further, execution platforms 24 may determine a correlation of one or more dimensions (e.g., a selected row or column) of the multi-dimensional datasets stored to databases 26 to query results 29—provided in response to transformed intents 23 (which are represented by statements 27)—output by MLM 44. Execution platforms 24 may invoke multiple MLM 44 responsive to intents 23 (or transformed intents 23 represented by statements 27) that analyze query results 29 resulting from accessing, based on statements 27, to obtain results 25. Based on the determined correlation, execution platforms 24 may select one or more of MLM 44 to obtain result 25 (e.g., selecting MLM 44 having the determined correlation above a threshold correlation as one or more sources of result 25). Execution platforms 24 may output result 25 for each of the one or more of MLM 44 to server 28, which may provide output result 25 via interface 21.

Execution platforms 24 may determine a sentence in plain language explaining why one or more of MLM 44 were selected, utilizing the determined correlation to facilitate generation and/or determination of the sentence. Execution platforms 24 may include the sentence explaining why one or more of MLM 44 were selected as part of results 25 provided by way of interface 21 to client device 14, thereby potentially enabling user 16 to trust result 25. Such trust may enable user 16, whether an experienced data scientist or a new user, to gain confidence in result 25 such that user 16 may reduce a number of interactions with client device 15 to receive result 25.

Again, as fewer attempts to access databases 26 may occur as a result of such explanation, both client device 14 and host device 12 may operate more efficiently. That is, client device 14 and host device 12 may receive fewer queries 19 in order to successfully access databases 26 to provide results 25 that may, again, potentially result in less consumption of resources, such as processor cycles, memory, memory bandwidth, etc., and thereby result in less power consumption.

In operation, server 28 may expose a language sub-surface 18 via interface 21 by which to receive a query 19 conforming to the portion of the language provided by exposed language sub-surface 18. Server 18 may invoke CNLP unit 22 to reduce query 19 to intents 23 as described above, where such intents 23 are representative of query 19. Server 28 may obtain intents 23 and invoke execution platforms 24 to process intents 23, passing intents 23 to execution platforms 24.

Execution platforms 24 may, responsive to receiving intents 23, invoke one or more of transform units 34 that apply one or more transforms to intents 23 that convert intents 23 into one or more statements 27 that conform to the formal syntax associated with the dataset stored to databases 26. In some examples, execution platform 24 may categorize or, in other words, classify intents 23 to identify which of transform units 34 to invoke. To illustrate, one or more of intents 23 may indicate one or more rows along with an operation, such as rows that contain a particular value in an identified column (e.g., by name or variable) of the dataset are to be "kept" (e.g., having a particular value in the identified column) while the remaining rows are to be removed from the working dataset, as will be explained in more detail below. Execution platform 24 may categorize these intents 23 as a database query that requests only a subset of the rows of the dataset that meet the condition (e.g., having the identified value), thereby invoking certain ones of transform units 34. The invoked ones of transform units 34 may transform the one or more of intents 23 into statements 27 that conform to the formal SQL syntax.

In this respect, the foregoing example enables host device 12 to receive a query 19 that identifies one or more dimensions of the dataset to "keep" in the working dataset. Execution platforms 24 may invoke transform units 34 to apply transforms that convert intents 23 (representative of query 19) into statements 27 that conform to the formal SQL syntax associated with the underlying dataset stored to databases 26. Execution platforms 24 may then access, based on statements 27, the dataset stored to databases 26 to obtain a query result 29 (that in this example includes the one or more dimensions of the dataset identified by query 19), and output the query results 29 as part of result 25.

Further, as noted above, execution platforms 24 may apply a number of different MLM 44 to the multi-dimensional dataset stored to databases 26 to obtain a result output by each of different MLM 44. Examples of MLM 44 include a neural network, a support vector machine, a naïve Bayes model, a linear regression model, a linear discriminant analyses model, a light gradient boosted machine (light-GBM) model, a decision tree, etc.

Execution platform 24 may determine a correlation between each dimension of the multi-dimensional dataset to the result output by each of MLM 44. Correlation may refer to a statistical association that represents a degree to which a pair of variables are linearly related. As such, execution platform 24 determines a correlation coefficient for each dimension (e.g., column or row) of the multi-dimensional dataset to the result output by each of MLM 44. Execution platform 24 may determine this correlation to evaluate which dimension most accurately forms the result output be each of MLM 44, thereby enabling selection of a subset (meaning, less than all but not none) of MLM 44 having an associated correlation with a meaningful dimension (as measured in terms of randomness, uniqueness, entropy—as understood in the context of information theory, etc.) of the multi-dimensional dataset that exceed some threshold correlation.

In this way, execution platform 24 may select, based on the correlation, a subset of MLM 44 to obtain a result 25 for each of the subset of MLM 44. Execution platform 24 may output result 25 for each of the subset of MLM 44, where such result 25 may include a sentence explaining the result using plain language. Execution platform 24 may also include, in result 25, a graph identifying a relevance of each of the one or more dimensions of the multi-dimensional dataset to the result for each of the subset of MLM 44. More information concerning the foregoing aspects of the techniques are provided below with respect to FIGS. 2A-3G.

Figure 2B:
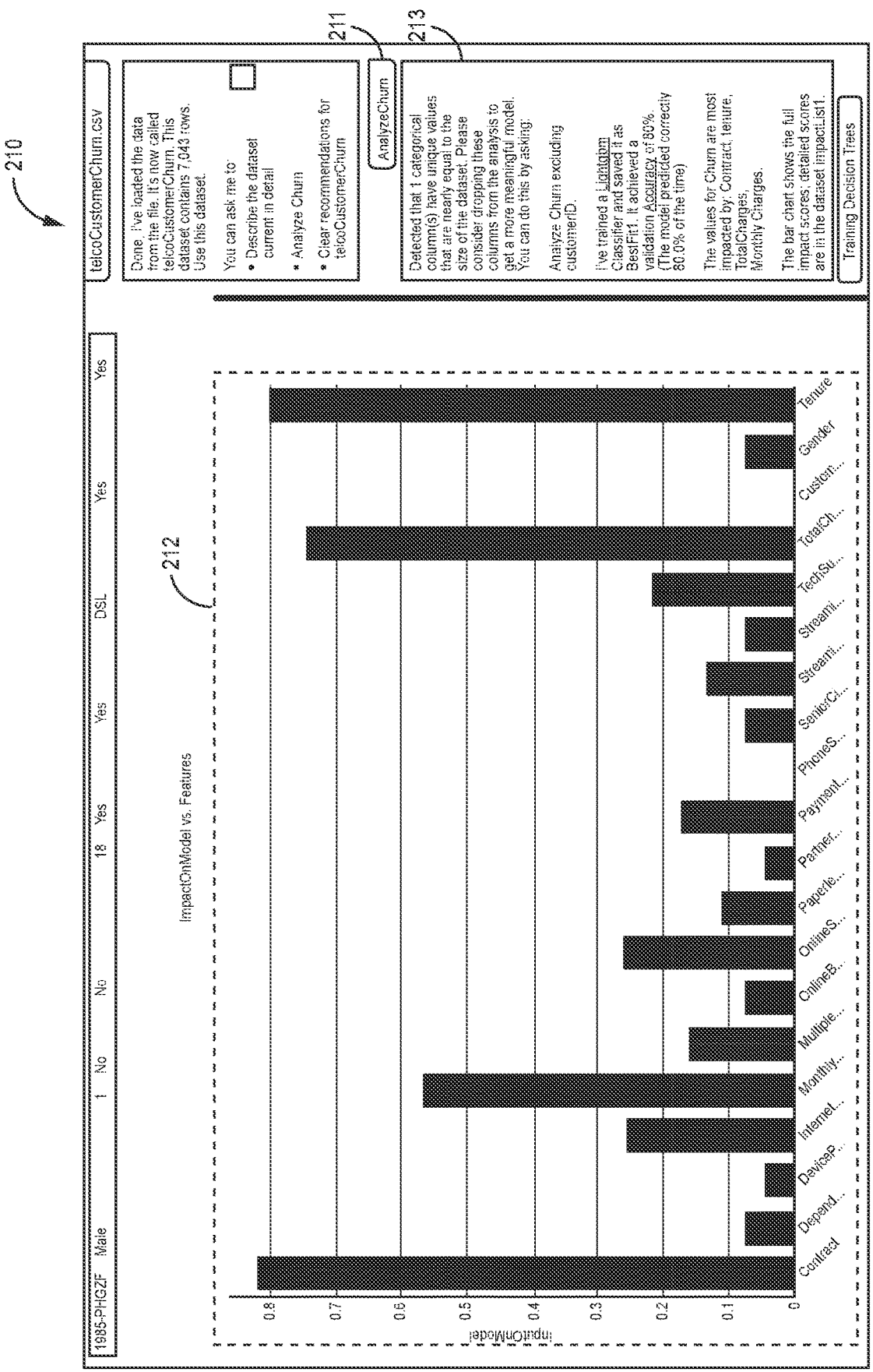

FIGS. 2A-2I are diagrams illustrating interface 21 presented by host device 12 for selecting machine learning models selection and evaluation in accordance with various aspects of the techniques described in this disclosure. In the example of FIG. 2A, a screenshot 200 of interface 21 (which may be denoted as "interface 21A") is shown in which host device 12 present an initial prompt 201 by which to engage user 16. User 16 then enters a command 202 in conversational language to "[l]oad data from the file telcoCustomerChurn.csv" that results in result 25A being displayed that lists the data from the telcoCustomerChurn.csv dataset. Host device 12 may include in result 25A, explanation 203, in plain language, that explains the dataset along with suggestions for suggested inputs 209, including a suggested input 209A to analyze churn for customers of the telecommunications service.

In the example of FIG. 2B, user 16 has selected suggested input 209A, which results in host device 12 providing interface 21B that is illustrated by screenshot 210 shown in the example of FIG. 2B. That is, user 16 has selected suggested input 209A that results in input 211 to "Analyze Churn," whereupon host device 12 has processed input 211 to generate chart 212 representative, in part, of result 25. Host device 12 provides chart 212 (which is another way to refer to a graph, hence chart 212 may be referred to as "graph 212") along with explanation 213 as result 25 in this example, where explanation 213 describes chart 25. Explanation 213 states that "[d]etected that 1 categorical column(s) have unique values that are nearly equal to the size of the dataset." Explanation 213 continues to note that "[p]lease consider dropping these columns from the analysis to get a more meaning model," where "[y]ou can do this by asking:" with a link to a suggested input to "Analyze Churn excluding customerID."

In this example, host device 12 has invoked execution platforms 24 to analyze the telcoCustomerChurn.csv dataset to determine a correlation of the columns (or other dimensions) relative to results provided by each of MLM 44. Execution platforms 24 may execute a dimension reduction algorithm that detects unique and/or random numbers for certain dimensions and thereby identified that the customerID column appears to have little relevance (due to the random and/or unique nature of the underlying customerID data) on any analysis resulting from applications of one or more of MLM 44. Host device 12 may then provide explanation 213 with a suggested input (noted above) automatically explaining that a better result may be achieved using the suggested input, all of which occurs via plain language sentences.

Explanation 213 continues, noting that host device 12 has "trained a Lightgbm classifier and saved it as BestFit1," which "achieved a validation Accuracy of 80.0%" providing a further explanation that "[t]he model predicted correctly 80% of the time." In this respect, host device 12 has further explained result 25 using plain language that allows user 16 to trust result 25. Moreover, explanation 213 notes that the "values for Churn are most impacted by: Contract, tenure, TotalCharges, MonthlyCharges," which are labels (or, in other words, names or variable names) for dimensions (i.e., columns in this example) of the telcoCustomerChurn.csv dataset. Explanation 213 also notes that the "bar chart [chart 212] shows the full impact scores; detailed scores are in the dataset ImpactList1," where ImpactList1 is a suggested link for viewing the impact of each dimension on the result to the lightGBM one of MLM 44. In other words, chart 212 indicates an impact (or, in other words, correlation) of each dimension (which in this instance refers to columns of the dataset) on the result output by the lightGBM model of MLM 44.

In other words, execution platforms 24 may invoke each of MLM 44, training MLM 44 for the underlying dataset, and then apply each of MLM 44 to determine a respective result. Execution platforms 24 may next determine a correlation between each dimension of the dataset to the result output by each of MLM 44, selecting the result of each MLM 44 having a corresponding correlation that exceeds a high correlation threshold (e.g., which may be 60-70%). Execution platform 24 may provide explanation 213 to explain chart 212 in plain language to facilitate easy understanding of chart 212 while also providing links to allow user 16 to further explore and/or understand the creation of chart 212.

Figure 2C:
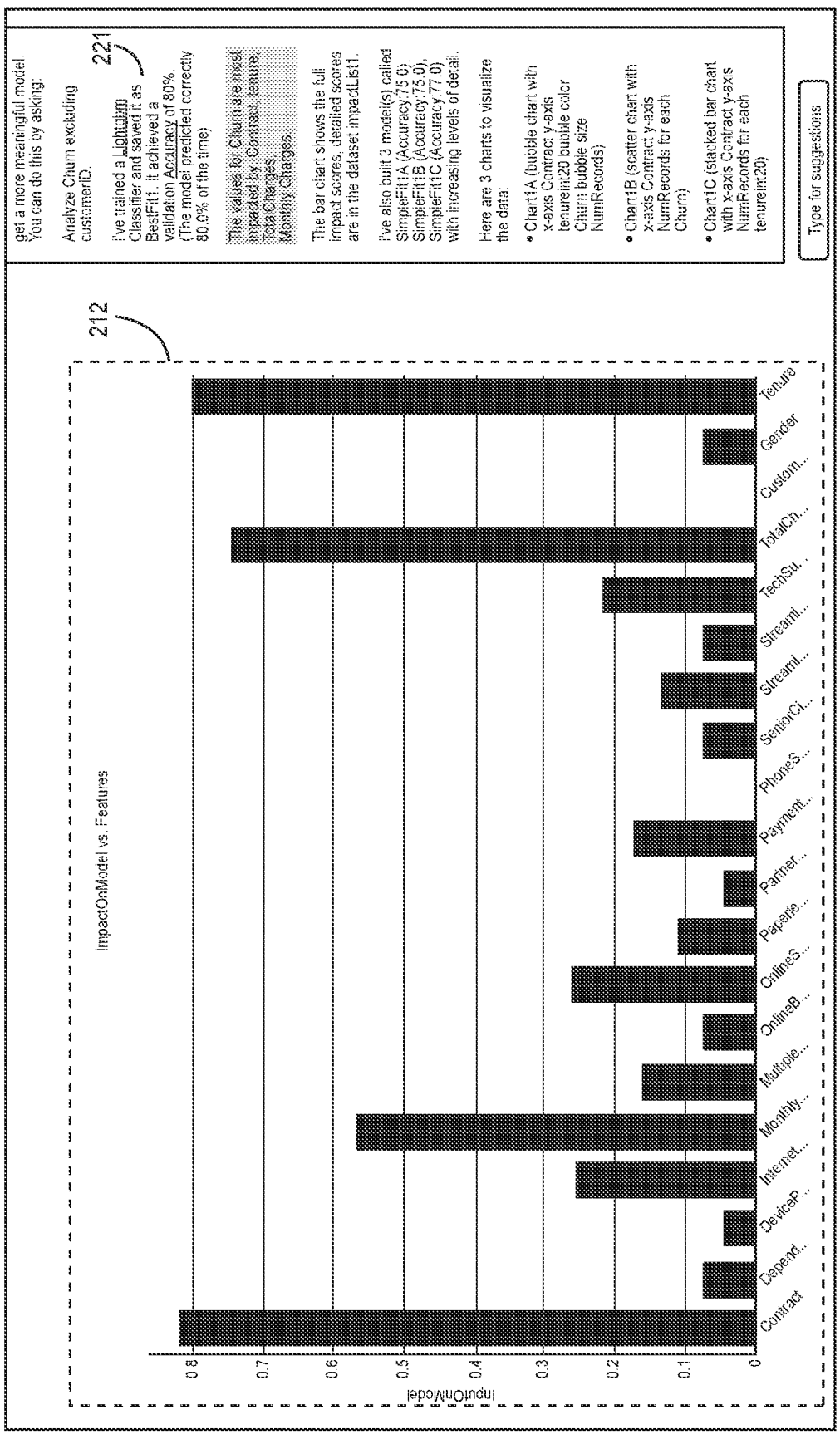

FIG. 2C is a diagram illustrating another example of interface 21 (which may be denoted as interface 21C), where screenshot 220 of interface 21C presents a further explanation 221 indicating, in plain language, that the "bar chart [chart 212] shows the full impact scores," and noting that the "detailed scores are in the dataset ImpactList1" with a hyperlink to facilitate access to the dataset ImpactList1. In this respect, explanation 221 explains the that chart 212 represent an impact graph (or, in other words, an impact chart), and further explains, as noted below and in plain language, the formulation of chart 212 (which may also be referred to as a visual chart).

Explanation 221 further indicates that three additional models "called SimpleFit1A (Accuracy: 75.0), SimpleFit1B (Accuracy: 75.0), SimpleFit1C (Accuracy: 77.0) with increasing levels of detail." In the example of FIG. 2C, each of the model names, SimpleFit1A, SimpleFit1B, and SimpleFit1C, are referenced via hyperlinks to enable user 16 to quickly view the results of the three additional models, each of which may represent another iteration of MLM 44. In this respect, execution platforms 24 have generated and trained a complicated model referred to as Lightgbm and additional models that are simple fit models (being less complicated, or simpler, than the Lightgbm model).

In addition, explanation 221 also states that there are 3 additional "charts to visualize the data," referencing each of Chart1A, Chart1B and Chart1C as hyperlinks to again facilitate access by user 16 to the additional charts. Explanation 221 also describes each of Chart1A-Chart1C, noting that Chart1A is a "bubble chart with x-axis Contract y-axis tenureInt20 bubble color Churn bubble size NumRecords," Chart1B is a "scatter chart with x-axis Contract y-axis NumRecords for each Churn," and Chart1C is a "stacked bar chart with x-axis Contract y-axis NumRecords for each tenureInt20."

In this respect, execution platforms 24 may determine, based on the results for each of MLM 44, one or more charts to explain the corresponding result output by each of MLM 44, such as chart 212 and Charts1A-Chart1C. Execution platforms 24 may rank the charts to identify the highest ranked chart (which in the example of FIG. 2C is chart 212), selecting the highest ranked chart for output via interface 21. Execution platforms 24 may rank the charts based on model accuracy as discussed in explanation 221 (where the accuracy is provided next to the lightGBM model and each model SimpleFit1A-SimpleFit1C.

Although not shown in the example of FIG. 2C, execution platforms 24 may also identify dimensions of the dataset that have low correlation. Execution platform 24 may identify the dimensions that have low correlation by comparing the correlation for each dimension to a low correlation threshold (which may also be referred to as a relevance threshold). That is, execution platform 24 may determine, based on a comparison of the correlation determined between the one or more dimensions and the result output by each of MLM 44 to the relevance threshold, one or more low relevance dimensions of the multi-dimensional dataset that have low relevance to the result output by each of MLM 44.

Execution platform 24 may provide an explanation, for example, that indicates that various dimensions, such as the dimension denoted by name "gender," does not relate to the churn analysis performed by the lightGBM model of MLM 44. Such explanation may be different than denoting that customerID does not appear to have much relevance to the result produced by the lightGBM model, as execution platform 24 may perform a different analysis on customerID to determine that customerID appears to be a random, unique number assigned to each row of the dataset.

Figure 2D:
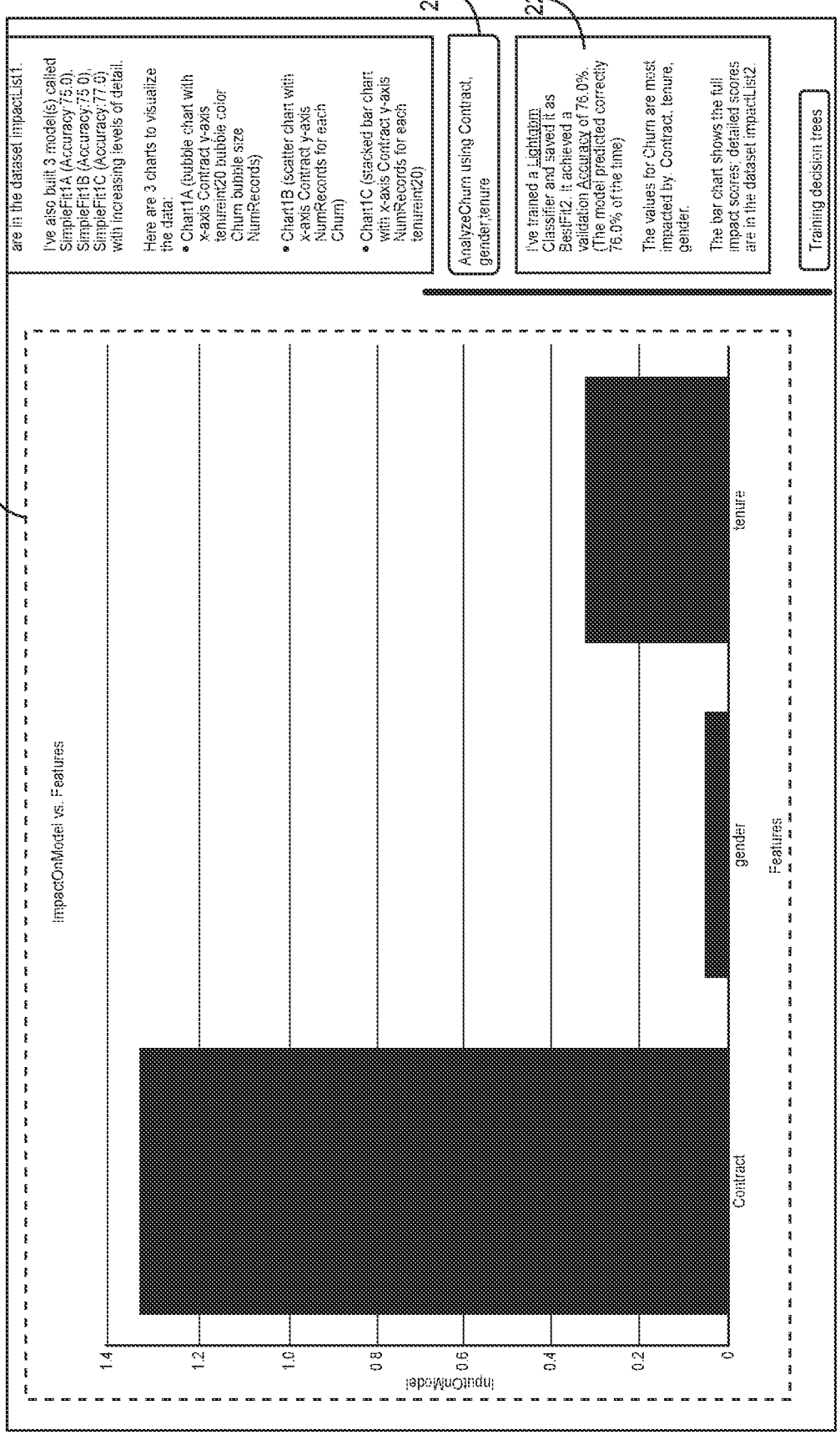

In the example of FIG. 2D, user 16 has entered input 226 indicating that host device 12 should "Analyze Churn using Contract, gender, tenure," where "Contract," "gender," and "tenure" refer to labels assigned to dimensions (again, columns in this example) of the telcoCustomerChurn.csv dataset. Host device 12 may process input 226 in the manner described above in which execution platforms 24 may process intents 23 representative of input 226 to obtain chart 227 and explanation 229, providing chart 227 and explanation 229 as result 25 via interface 21 to client device 14.

Chart 227 represents another impact graph that is focused on the three identified dimensions in input 226, indicating that the "Contract" dimension has the most impact (of the three identified dimensions) followed by the "tenure" dimension, and then the "gender" dimension. Execution platforms 24 may build another lightGBM model that assesses the three identified dimensions to determine whether such dimensions impact customer churn (for the telecommunication contract).

Explanation 229 explains chart 227, stating that "I've trained a Lightgbm classifier and saved it as BestFit2," which "achieved a validation accuracy of 76%." Explanation 229 further notes that the "model predicted correctly 76% of the time," before continuing to note that the "values for Churn are most impacted by: Contract, tenure, gender" naming the dimensions in order of impact (or, in other words, correlation to) on Churn. Explanation 229 concludes by stating that the "bar chart shows the full impact scores," indicating that "detailed scores are in the dataset ImpactList2." Explanation 229 provides the ImpactList2 as a hyperlink that user 16 may quickly access to more fully explore the detailed impact scores.

Figure 2E:
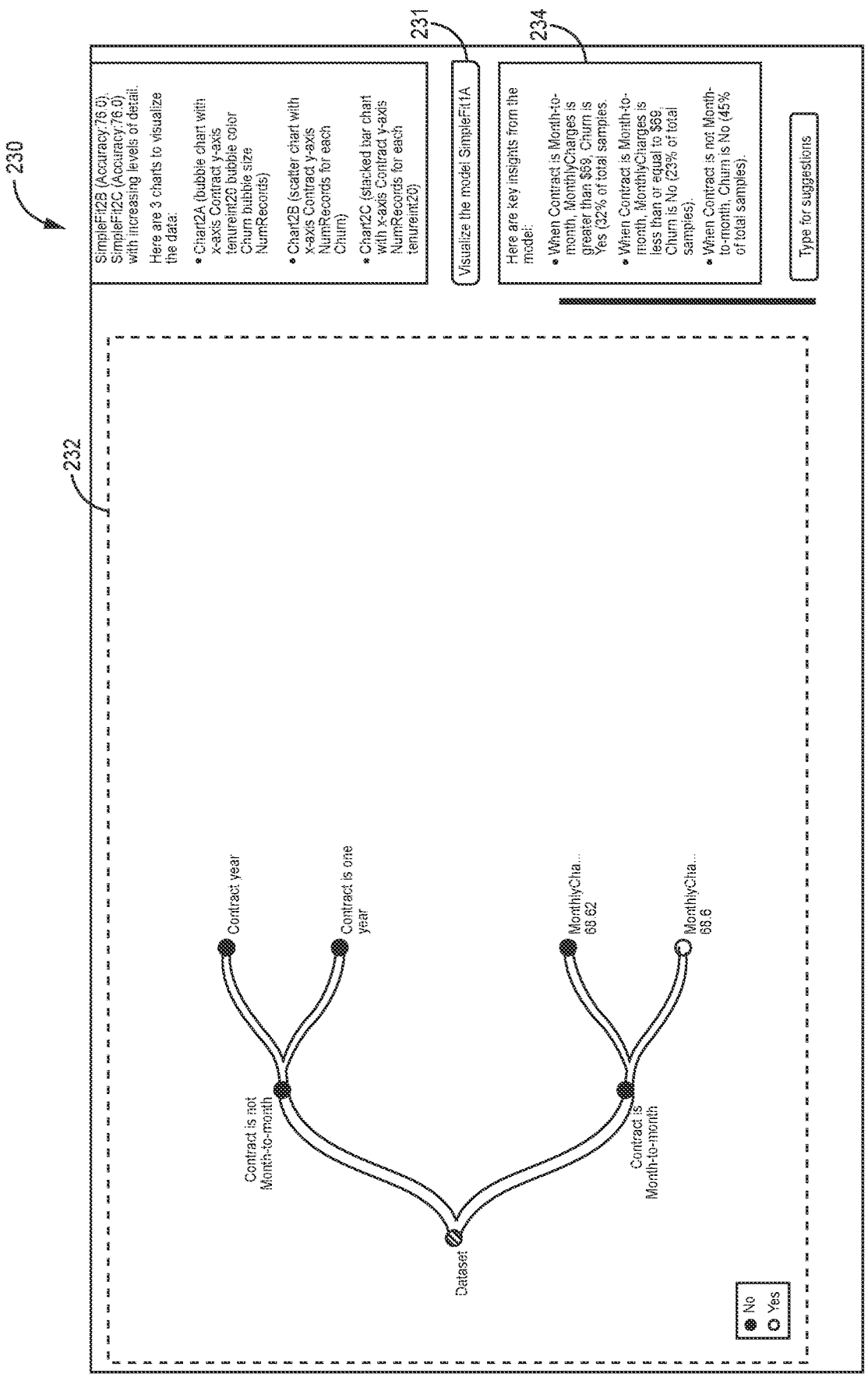

Referring next to the example of FIG. 2E, screenshot 230 represents another example of interface 21 in which user 16 has entered input 231 to "Visualize the model SimpleFit1A." Responsive to input 231, host device 12 may invoke execution platforms 24 to process intents 23 parsed from input 231 to generate a result 25 that includes diagram 232 and explanation 234.

Execution platforms 24 may build and train a decision tree that can be visualized as diagram 232 in which the dark circles represent "No" customer churn, while the light circles indicate "Yes," or in other words indicative of an impact, in terms of customer churn. Starting from the initial dataset, diagram 232 indicates that there are two initial branches related to whether the contract is or is not a month-to-month contract. In the "Contract is not Month-to-month" branch, diagram 232 includes two sub-branches indicating whether or not the contract year or the contract is one year dimensions factor in to customer churn with both being unrelated ("No") to customer churn. In the "Contract is Month-to-month" branch, diagram 232 includes two sub-branches indicating whether or not the monthly charge being less than or greater than $68.6 to customer churn, with less than $68.6 being unrelated to customer churn and churn occurring ("Yes") when the monthly cost is equal to or greater to $68.6.

Execution platform 24 may also translate diagram 232 into explanation 234, which provides the following "key insights:"

When Contract is Month-to-month, MonthlyCharges is greater than $69, Churn is Yes (32% of total samples).

When Contract is Month-to-month, MonthlyCharges is less than or equal to $69, Churn is no (23% of total samples).

When Contract is not Month-to-month, Churn is No (45% of total samples).

Using these key insight provided by explanation 234 and reviewing diagram 232 may enable user 16 to better understand diagram 232 in terms of analyzing customer churn.

Figure 2F:
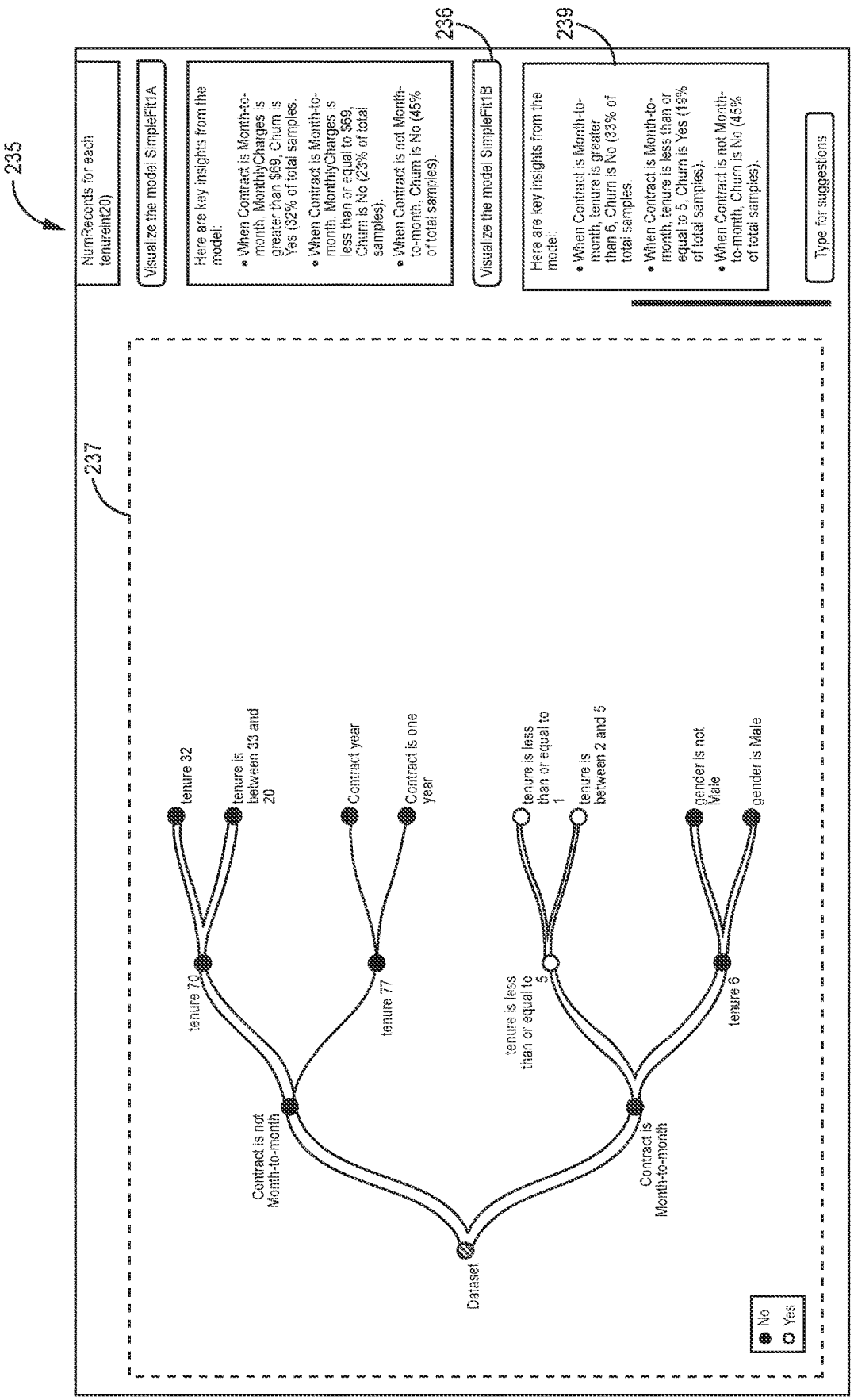

In the example of FIG. 2F, screenshot 235 provides another example of interface 21 in which user 16 has entered input 236 to "Visualize the model SimpleFit1B." Responsive to input 236, host device 12 may invoke execution platforms 24 to process intents 23 parsed from input 236 to generate a result 25 that includes diagram 237 and explanation 239.

Execution platforms 24 may build and train decision trees having various degrees of granularity where the levels of granularity may be controller by user 16 setting a skill level to a value between 1 and 3 (1 being a novice, and 3 being an expert where higher levels of granularity are provided as you move up the skill level). In the example of FIG. 2F, the decision tree has four levels, starting with "Dataset" and moving down three additional node levels, providing an additional level of granularity compared to the decision tree shown in diagram 232. The decision tree visualized in diagram 237 begins with two branches from "Dataset" that are the same as those presented in diagram 232. However, in the "Contract is not Month-to-month" branch, diagram 237 provides two sub-branches regarding tenure being either 70 or 71. In the "tenure 70" branch, diagram 237 provides two addition sub-branches directed to whether tenure is less than 32 or between 33 and 70. In the "tenure 71" branch, diagram 237 provides two sub-branches directed to whether the contract is less than a year or contract is one year. In each instance, of the contract is not month-to-month branch, the dark circles (or, in other words, nodes) represent no contract churn.

In the "Contract is Month-to-month" branch, diagram 237 provides two sub-branches directed to whether the "tenure is less than or equal to 5" or "tenure 6." The light node representative of "tenure is less than or equal to 5" in diagram 237 represents relatively higher correlation to the customer churn analysis, thereby indicating that tenure is less than or equal to 5 may result in customer churn. The dark node representative of "tenure 6" (or greater) may indicate a relatively low correlation to customer churn.

Under the "tenure is less than or equal to 5" branch, diagram 237 provides two sub-branches of "tenure is less than or equal to 1" and "tenure is between 2 and 5" with both having relatively higher correlation to customer churn as indicated by the light nodes. Under the "tenure 6" branch, diagram 237 provides for two sub-branches that indicate "gender is not Male" and "gender is Male," but neither of these nodes have a relatively high correlation to customer churn as indicated by the dark nodes.

Again, execution platform 24 may also translate diagram 237 into explanation 239, which provides the following "key insights:"

When Contract is Month-to-month, tenure is greater than 6, Churn is No (36% of total samples).

When Contract is Month-to-month, tenure is less than or equal to 5, Churn is Yes (19% of total samples).

When Contract is not Month-to-month, Churn is No (45% of total samples).

Using these key insight provided by explanation 239 and reviewing diagram 237 may enable user 16 to better understand diagram 237 in terms of analyzing customer churn.

Moreover, as can be seen throughout the examples of FIG. 2A-2F, user 16 may enter a simple query 19 (such as input 236 shown in FIG. 2F) that results in host device 12 automatically, without any additional input from user 16, creating charts, diagrams, and other results in a visual manner to assist user 16 in interpreting results 25. Moreover, host device 12 automatically, without any additional input from user 16, may provide the explanation in plain language that allows user 16 to gain confidence with results 25, as well as link through to additional datasets, charts, models, etc.

In the example of FIG. 2G, screenshot 250 provides another example of interface 21 in which user 16 has entered input 251 to "Plot Chart Chart1A," referring to the Chart1A discussed above with respect to explanation 221 shown in the example of FIG. 2C. Responsive to input 251, host device 12 may invoke execution platforms 24 to process intents 23 parsed from input 251 to generate a result 25 that includes diagram 252 and explanation 254.

Execution platforms 24 may build and train simpler models (in terms of complexity than the lightGBM model) that result in different charts, such as chart 252 that presents bubbles indicative of "Yes" or "No" churn similar to the visualization of the decision trees. The size of the bubbles indicate the relative number of "Yes" or "No" customer churn. Execution platform 24 also provides explanation 254 that explains the formulation of chart 252 as follows:

First, I distributed tenure into several buckes, each with size 20, and named the new column tenureint20.

Then, I computed the count of records for each Churn, Contract and tenureint20 calling the output columns NumRecords.

Finally, I plotted a bubble chart with Contract as the x-axis, tenureint20 as the y-axis, the bubble color was set using Churn, NumRecords was used to set the size of the bubble.

Figure 2H:
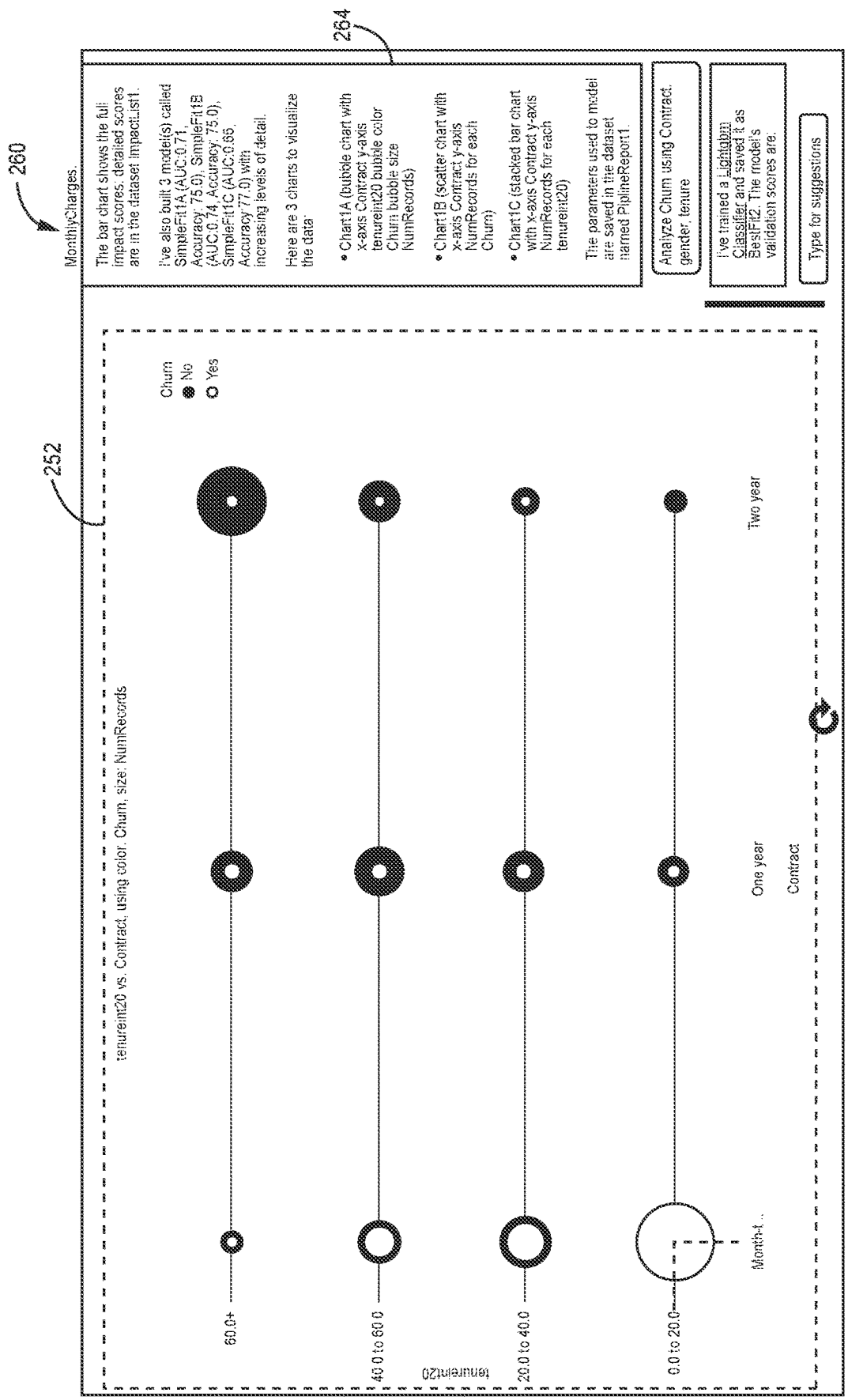

As noted above, user 16 may set different levels of skill (from 1 to 3). Screenshot 250 shows interface 21 when configured to present information at a skill level of 1. In the example of FIG. 2H, screenshot 260 shows interface 21 when configured to present information at a skill level of 2 or 3. Screenshot 260 includes the same chart 252, but provides a much more comprehensive explanation 254.

Explanation 264 states the following:
<not shown in FIG. 2H> Detected that 1 categorical column(s) have unique values that are nearly equal to the size of the dataset. Please consider dropping these columns from the analysis to get a more meaningful model. You can do this by asking:
Analyze Churn excluding customerID [which is a hyperlink to allow user 16 to quickly enter this as an input/query]
I've trained a Lightgbm Classifier and saved it as BestFit1. The model's validation scores are:
  Accuracy: 80.0%
  AUC: 0.85
The values for Churn are most impacted by: Contract, tenure, TotalCharges, MonthlyCharges. </not shown in FIG. 2H>
The bar chart shows the full impact scores; detailed scores are in the dataset ImpactList1.
I've also bit 3 model(s) called SimpleFit1A (AUC: 0.71, Accuracy: 75.0), SimpleFit1B (AUC: 0.71, Accuracy: 75.0), SimpleFit1C (AUC: 0.66, Accuracy: 77.0) with increasing levels of detail.
Here are 3 charts to visualize the data:
  Chart1A (bubble chart with x-axis Contract y-axis tenureInt20 bubble color Churn bubble size NumRecords)
  Chart1B (scatter chart with x-axis Contract y-axis NumRecords for each Churn)
  Chart1C (stacked bar chart with x-axis Contract y-axis NumRecords for each tenureInt20)
The parameters used to model are saved in the dataset named PipelineReport [which is provided as a hyperlink to quickly allow user 16 to enter a query/input for the PipelineReport].

Figure 2I:
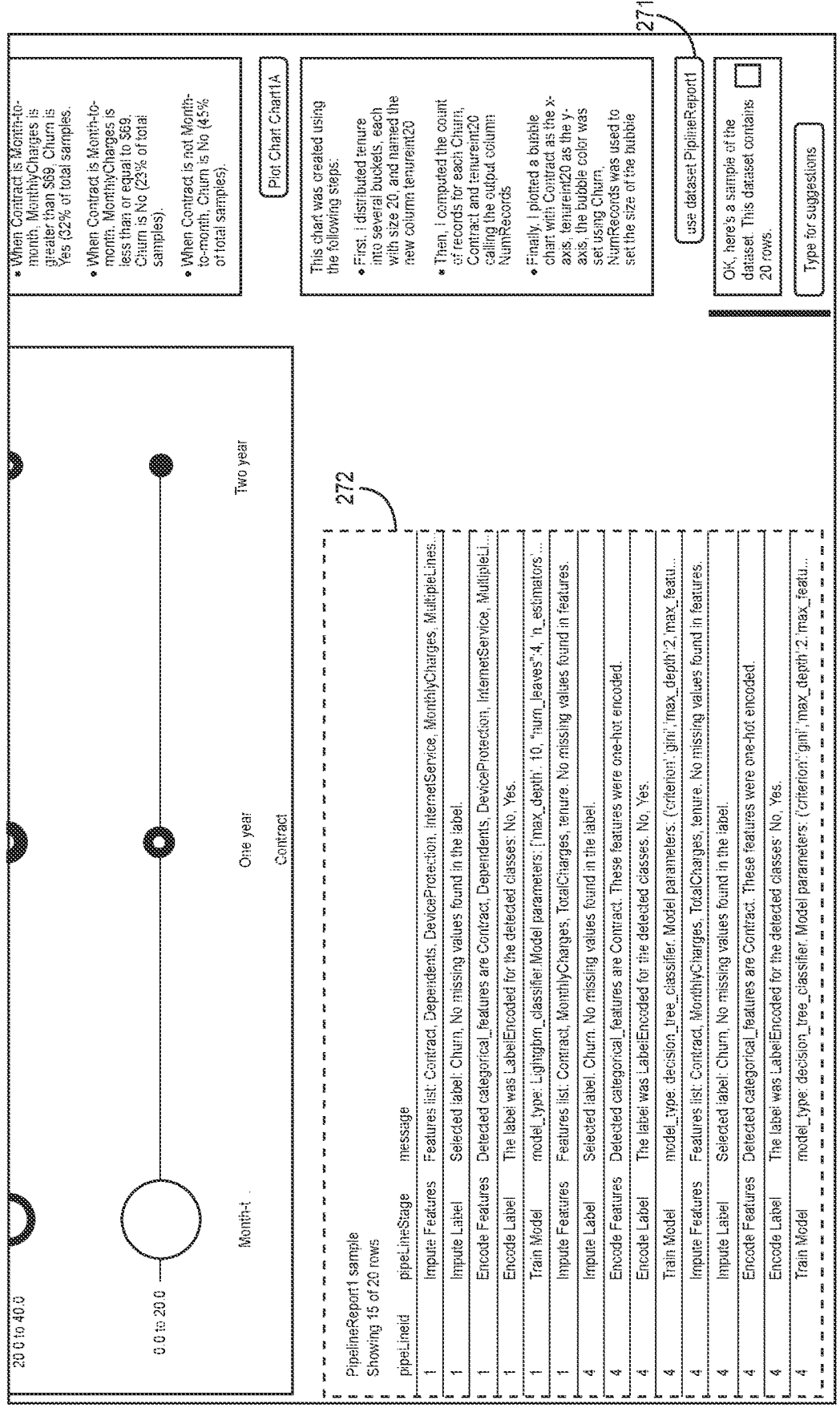

In this example, execution platforms 24 have provided more insight into how the models were constructed and also allowed user 16 to retrieve the PipelineReport. In the example of FIG. 2I, a screenshot 270 shows interface 21 after requesting the PipelineReport via input 271. Host device 12 may invoke execution platforms 24 to interface with databases 26 to retrieve pipeline report 272, returning pipeline report 272 as a result to client device 14. Pipeline report 272 may enable data scientists to better understand how MLM 44 are created, trained, and employed in order to retrieve the various results. In this manner, host device 12 may generate a pipeline report 272 explaining, in more technical detail and not necessarily in plain language, how host device 12 produced MLM 44, and output pipeline report 272 for review by user 16 (e.g., when the skill level is set to a level of 2 or 3). Such pipeline reports 272 may facilitate audits and other internal reviews.

FIGS. 3A-3G are additional diagrams illustrating interface 21 presented by host device 12 for accessing datasets in accordance with various aspects of the constrained natural language processing techniques. Referring first to the example of FIG. 3A, a screenshot 300 may represent another example of interface 21 in which user 16 has entered query 301 to "Load data from the file sba.csv," which host device 12 processes using CNLP unit 22 to determine intents 23 that execution platforms 24 may transform (through invocation of transform units 34) into formal statements 27 that conform to the formal syntax associated with the datasets (loaded from file sba.csv). Execution platforms 24 may access databases 26 using statements 27 to obtain query results 29 from which preview 302 is formed. Execution platforms 24 return preview 302 as result 25 to client device 14.

In addition, user 16 may interface with client device 14 to enter query 303 that indicates in plain language to "[k]eep the rows where BorrState contains WI." Again, host device 12 may invoke CNLP unit 22 to process query 303 to parse one or more intents 23 from query 303, providing the intents 23 to execution platforms 24. Execution platforms 24 may invoke transform unit 34 to transform intents 23 (representative of query 303) into one or more select statements 27 (such as SQL select statements) that conform to the formal syntax associated with the dataset.

Execution platforms 24 may access, based on select statements 27, the dataset to obtain query result 29 that includes the one or more dimensions of the dataset identified by query 303. That is, query 303 indicates to keep the rows where BorrState (which is a an example label identifying a dimension) contains a value "WI." As such, execution platforms 24 obtain any rows having a value of "WI" for the column BorrState, returning query results 29 from which preview 304 is generated.

In the example of FIG. 3B, a screenshot 310 illustrates interface 21 in which user 16 has entered a query 311 requesting to "[k]eep the columns BorrCity, BorrState, BorrStreet." Again, host device 12 invokes, responsive to query 311, CNLP unit 22 to parse intents 23 from query 311, providing intents 23 to execution platform 24. Execution platform 24 may invoke transform unit 34 to transform intents 23 into select statements 27 that select the columns identified by query 311 (i.e., BorrCity, BorrState, BorrStreet in this example) using the formal syntax associated with the dataset.

Execution platform 24 may access databases 26 using select statements 27 to obtain query results 29 from which a preview 312 is formed. Host device 12 may then provide preview 312 via interface 21 to client device 14 as part of result 25, which presents preview 312.

In the example of FIG. 3C, a screenshot 315 of interface 21 shows that user 16 has entered a query 316 to "[k]eep the rows where ApprovalFiscalYear is greater than 2009." Again, host device 12 invokes, responsive to query 316, CNLP unit 22 to parse intents 23 from query 316, providing intents 23 to execution platform 24. Execution platform 24 may invoke transform unit 34 to transform intents 23 into select statements 27 that select the rows identified by query 311 (i.e., rows having a value in the column labeled ApprovalFiscalYear with a value greater than 2009) and that conform to the SQL syntax.

Execution platform 24 may access databases 26 using select statements 27 to obtain query results 29 from which a preview 312 is formed. Host device 12 may then provide preview 312 via interface 21 to client device 14 as part of result 25, which presents preview 312.

In the example of FIG. 3D, a screenshot 320 of interface 21 shows that user 16 has entered a query 321 to "[c]ompute count of records, tototal GrossApproval, total GrossChargeOffAmount, maximum GrossApproval for each ApprovalFiscalYear, BorrState calling the output columns NumberOfLoansMade, TotalApproved, TotalLost, MaximumLoan." Again, host device 12 invokes, responsive to query 321, CNLP unit 22 to parse intents 23 from query

321, providing intents 23 to execution platform 24. Execution platform 24 may invoke transform unit 34 to transform intents 23 into statements 27 that compute a number of loans made, a total amount approved, a total amount lost, and a maximum loan value and that conform to the SQL syntax.

In computing a number of loans made, a total amount approved, a total amount lost, and a maximum loan value, execution platform 24 may determine that another dataset can be used to satisfy query 321 (i.e., the sba_sample dataset in the example of FIG. 3D). Execution platform 24 may compose feedback 323 indicating that the sba_sample dataset may be used to answer query 321, providing feedback 323 as part of result 25. Execution platform 24 may then return to processing query 321 using the most recently loaded dataset (from the file sba.csv).

Execution platform 24 may access databases 26 (storing the most recently loaded dataset) using statements 27 to obtain query results 29 from which a preview 322 is formed. Host device 12 may then provide preview 322 via interface 21 to client device 14 as part of result 25, which presents preview 322.

In addition, execution platform 24 may maintain a working dataset formed from query results 29, referencing the working dataset in response to subsequent additional queries 19. The working dataset may represent an example of the most recently loaded dataset. Execution platform 24 may determine, however, that a dimension (e.g., a row and/or column) of the working dataset is not present but is referenced in additional subsequent queries 19. Execution platform 24 may then invoke transform unit 34 to transform this additional query into one or more additional statements 27, and then automatically (without requiring any additional input from user 16) access, based on the one or more additional statements 27 and responsive to determining that the identified dimension is not present in previous query result 29, the underlying dataset to obtain an additional query result 29. Execution platform 24 may provide these additional query results 29 as part of result 25.

In the foregoing example, query 321 is relatively complex in terms of computing a number of different values across a number of different dimensions of the underlying dataset. Using a formal syntax, such as SQL, execution platforms 24 may return different results depending on the ordering of the different computes within query 321, which may reduce a confidence by user 16 in results 25. However, execution platform 24 may return the same results regardless of the order in which the various operations are to be performed.

In other words, query 321 may represent a multi-part query having multiple query statements (e.g., compute the number of loans made, compute a total amount approved, compute the total amount lost, compute the maximum loan value, etc.). CNLP unit 22 may however process query 321 by exposing language sub-surfaces 18 in a manner that removes ambiguity in defining query 321 such that multiple query statements forming the multi-part query are definable in any order, but result in the same intents 23. As such, execution platform 24 may transform multi-part query 321 into the same one or more statements 27 regardless of the order in which the multiple query statements are defined to form multi-part query 321.

In the example of FIG. 3E, a screenshot 330 of interface 21 shows that user 16 has entered a query 331 to "[k]eep the rows where GrossApproval is less than the aggregate value median GrossApproval." Again, host device 12 invokes, responsive to query 331, CNLP unit 22 to parse intents 23 from query 331, providing intents 23 to execution platform 24. Execution platform 24 may invoke transform unit 34 to transform intents 23 into statements 27 that compute the median GrossApproval and select rows with a GrossApproval is less than the aggregate value median GrossApprova and that conform to the SQL syntax.

Execution platform 24 may access databases 26 (storing the most recently loaded dataset) using statements 27 to obtain query results 29 from which a preview 332 is formed. Host device 12 may then provide preview 332 via interface 21 to client device 14 as part of result 25, which presents preview 332.

In the foregoing example, query 331 is relatively complex in that various computations that are mentioned last in query 331 are required to be performed before selecting the rows. Using a formal syntax, such as SQL, execution platforms 24 may return different results depending on the ordering of the different query statements within query 331, which may reduce a confidence by user 16 in results 25. However, execution platform 24 may return the same results regardless of the order in which the various operations are to be performed.

In other words, query 331 may represent another example of a multi-part query having multiple query statements. CNLP unit 22 may however process query 331 by exposing language sub-surfaces 18 in a manner that removes ambiguity in defining query 331 such that multiple query statements forming the multi-part query are definable in any order, but result in the same intents 23. As such, execution platform 24 may transform multi-part query 331 into the same one or more statements 27 regardless of the order in which the multiple query statements are defined to form multi-part query 331.

In the example of FIG. 3F, a screenshot 340 of interface 21 shows that user 16 has entered a query 341 to "[c]reate a new window column TestWindow as average Fare computed over rows 10 before 3 after for each Parch sorted by Age." Again, host device 12 invokes, responsive to query 341, CNLP unit 22 to parse intents 23 from query 331, providing intents 23 to execution platform 24. Execution platform 24 may invoke transform unit 34 to transform intents 23 into statements 27 that, using the formal SQL syntax, compute the a window that computes an Average Fair 10 rows before and 3 rows after the current row when the rows are sorted by the value for the Age column.

Execution platform 24 may access databases 26 (storing the most recently loaded dataset) using statements 27 to obtain query results 29 from which a preview 332 is formed. Host device 12 may then provide preview 342 via interface 21 to client device 14 as part of result 25, which presents preview 342.

Figure 3G:
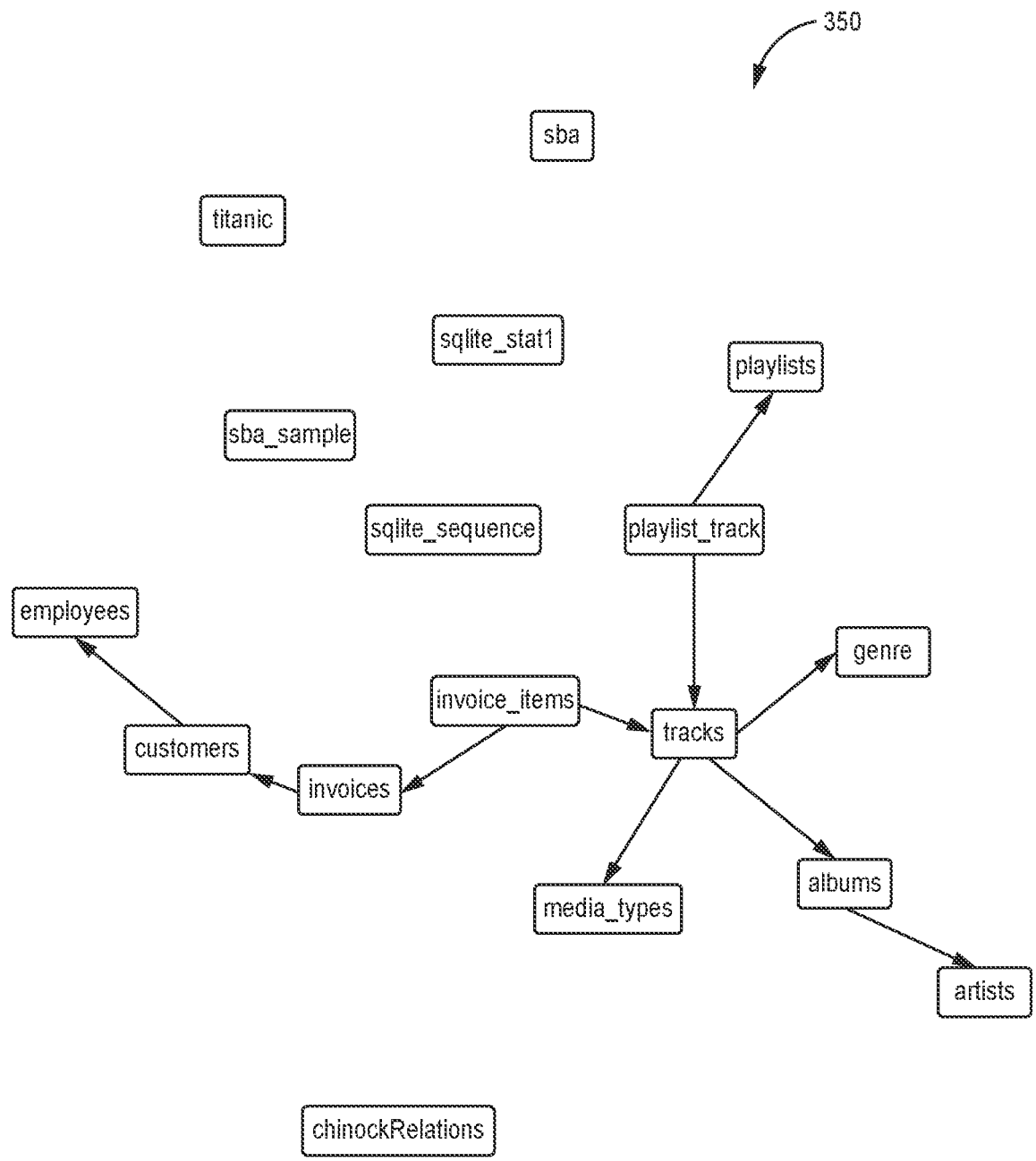

Referring next to the example of FIG. 3G, execution platforms 24 may receive intents 23 that require accessing multiple datasets. Execution platforms 24 may determine that intents 23 determine whether query 19 includes query statements that identify dimensions of datasets other than the current working dataset. When query statements identify dimensions of datasets other than the current working dataset, execution platforms 24 may automatically (without requiring any further input from user 16) join the current working dataset and the other datasets to obtain a joined dataset.

A screenshot 350 shown in the example of FIG. 3G illustrates how multiple datasets may be joined (as shown via arrows) to obtain the joined datasets (which becomes the working dataset). Execution platforms 24 may automatically create join statements 27, which conform to the formal SQL syntax, to join multiple datasets and thereby obtain the joined datasets.

In some examples, execution platforms 24 may formulate a graph data structure based on the relationships (again, similar to what is shown in example screenshot 350), where the graph data structure has nodes representative of each of the multiple datasets and edges representative of the relationship between the dimensions of the multiple datasets. Execution platforms 24 may traverse, based on intents 23, the graph data structure to identify a shortest path through the graph data structure by which to satisfy underlying query 19, automatically joining the datasets along the shortest path to obtain the joined dataset.

Moreover, execution platforms 24 may identify, when traversing the graph data structure, additional paths through the graph data structure that would satisfy query 19. Responsive to identifying additional paths, execution platform 24 may formulate an indication identifying the additional path through the graph data structure, providing the indication as part of results 25 that are presented to user 16 via client device 14. The indication may include a link for a revised query that would result in traversing the additional path through the graph data structure. In other examples, the indication may indicate that there is ambiguity that user 16 needs to resolve before completing query 19.

Execution platform 24 may output, responsive to query 19, a diagram similar to that shown in screenshot 350 that identifies the relationships between the one or more dimensions of the datasets (which represents a visualization of the graph data structure in the example of FIG. 3G). That is, execution platform 24 may identify relationships between one or more dimensions of the multiple datasets, and generate the diagram illustrating the relationship between the one or more dimensions of the datasets. Execution platform 24 may output the diagram as shown in the example of screenshot 350.

In any event, execution platforms 24 may then access, using various statements 27, the joined dataset (assuming automatic joins occur via the shortest path through the graph data structure) to obtain query results 29. Execution platforms 24 may update result 25 to include the query results 29, where host device 12 provides result 25 via interface 21 to client device 14.

Figure 4:
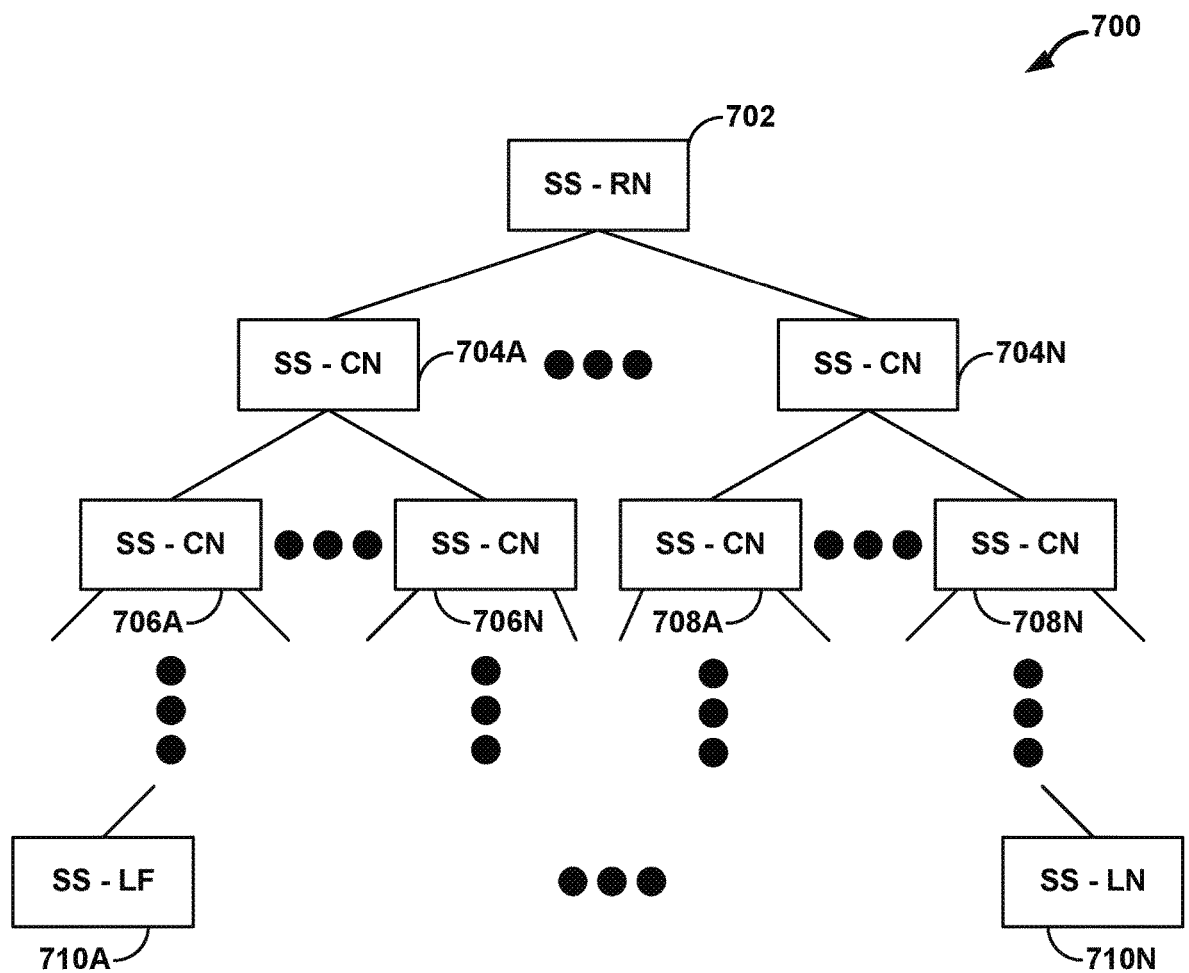
FIG. 4 is a block diagram illustrating a data structure used to represent the language surface shown in the example of FIG. 1 in accordance with various aspects of the techniques described in this disclosure.

FIG. 4 is a block diagram illustrating a data structure 700 used to represent the language surface 18 shown in the example of FIG. 1 in accordance with various aspects of the techniques described in this disclosure. As shown in the example of FIG. 4, the data structure 700 may include a sub-surface root node 702 ("SS-RN 702"), a number of hierarchically arranged sub-surface child nodes 704A-704N ("SS-CNs 704"), 706A-706N ("SS-CNs 706"), 708A-708N ("SS-CNs 708"), and sub-surface leaf nodes 710A-710N ("SS-LNs 710").

Sub-surface root node 702 may represent an initial starting node that exposes a basic sub-surface, thereby constraining exposure to the sub-surfaces dependent therefrom, such as SS-RNs 704. Initially, CNLP unit 22, for a new user 16, may only expose a limited set of patterns, each of which, as noted above, include identifiers, positional and keyword entities and ignored words. CNLP unit 22 may traverse from SS-RN 702 to one of SS-CNs 407 based on a context (which may refer to one of or a combination of a history of the current session, identified user capabilities, user preferences, etc.). As such, CNLP unit 22 may traverse hierarchically arranged nodes 702-710 (e.g., from SS-RN 702 to one of SS-CNs 704 to one of SS-CNs 706/708 to one of SS-LFs 710) in order to balance discoverability with cognitive overhead.

As described above, all of the patterns in the language surface may begin with an identifier, and the these identifiers are reused across patterns to group them into language sub-surfaces 702-710. For example, all the data visualization intents begin with "Plot." When beginning to enter an utterance in the text box, user 16 may view an auto-complete suggestions list containing one the first identifiers (like "Plot", "Load" etc.). Once user 16 completes the first identifier, CNLP unit 22 may only expose other patterns belonging to that language sub-surface as further completions. In the above example, only when user 16 specifies "Plot" as the first word, does CNLP unit 16 invoke the auto-complete mechanism to propose various chart formats (such as line chart, bubble chart, histogram, etc.). Responsive to user 16 specifying one of the autocomplete suggestion (e.g., line chart), CNLP unit 16 may expose the entities that user 16 would need to specify to configure the chart (like the columns on the axes, colors, sliders, etc.).

Conceptually, the set of all utterances (the language surface) may be considered as being decomposed into subsets (sub-surfaces) which are arranged hierarchically (based on the identifiers and entities in the utterances), where each level of the hierarchy contains all the utterances/patterns that form the underlying subsets. Using the auto-complete mechanism, user 16 navigates this hierarchy top-to-bottom, one step at a time. At each step, user 16 may only be shown a small set of next-steps as suggestions. This allows CNLP unit 22 to balance discoverability with cognitive overhead. In other words, this aspect of the techniques may be about how to structure the patterns using the pattern specification language: the design choices here (like "patterns begin with identifiers") are not imposed by the pattern specification language itself.

Additionally, certain language sub-surfaces are exposed only when corresponding conditions are met. For example, CNLP unit 22 may only expose the data visualization sub-surface when there is at least one dataset already loaded. This is achieved by associating each pattern with a function/procedure that looks at the current context (the history of this session, the capabilities and preferences of the user, etc.) to decide whether that pattern is exposed at the current time.

Figure 5:
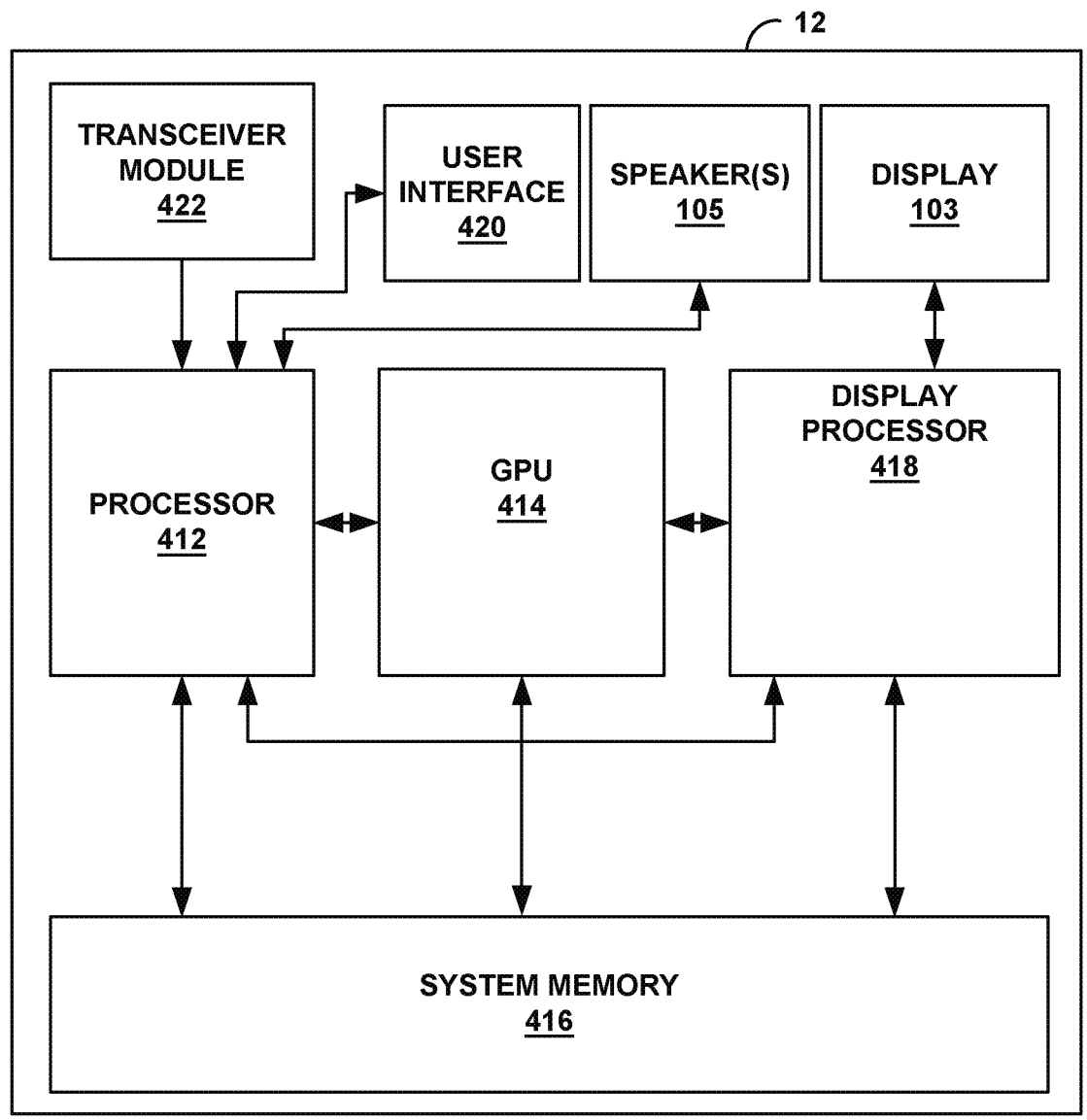
FIG. 5 is a block diagram illustrating example components of the devices shown in the example of FIG. 1.

FIG. 5 is a block diagram illustrating example components of the host device 12 and/or the client device 14 shown in the example of FIG. 1. In the example of FIG. 4, the device 12/14 includes a processor 412, a graphics processing unit (GPU) 414, system memory 416, a display processor 418, one or more integrated speakers 105, a display 103, a user interface 420, and a transceiver module 422. In examples where the source device 12 is a mobile device, the display processor 418 is a mobile display processor (MDP). In some examples, such as examples where the source device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played. The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the devices 12/14. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the various units/modules/etc. The transceiver module 422 may represent a unit configured to establish and maintain the wireless connection between the devices 12/14. The transceiver module 422 may represent one or more receivers and one or more transmitters capable of wireless communication in accordance with one or more wireless communication protocols.

In each of the various instances described above, it should be understood that the devices 12/14 may perform a method or otherwise comprise means to perform each step of the method for which the devices 12/14 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the devices 12/14 has been configured to perform.

Figure 6:
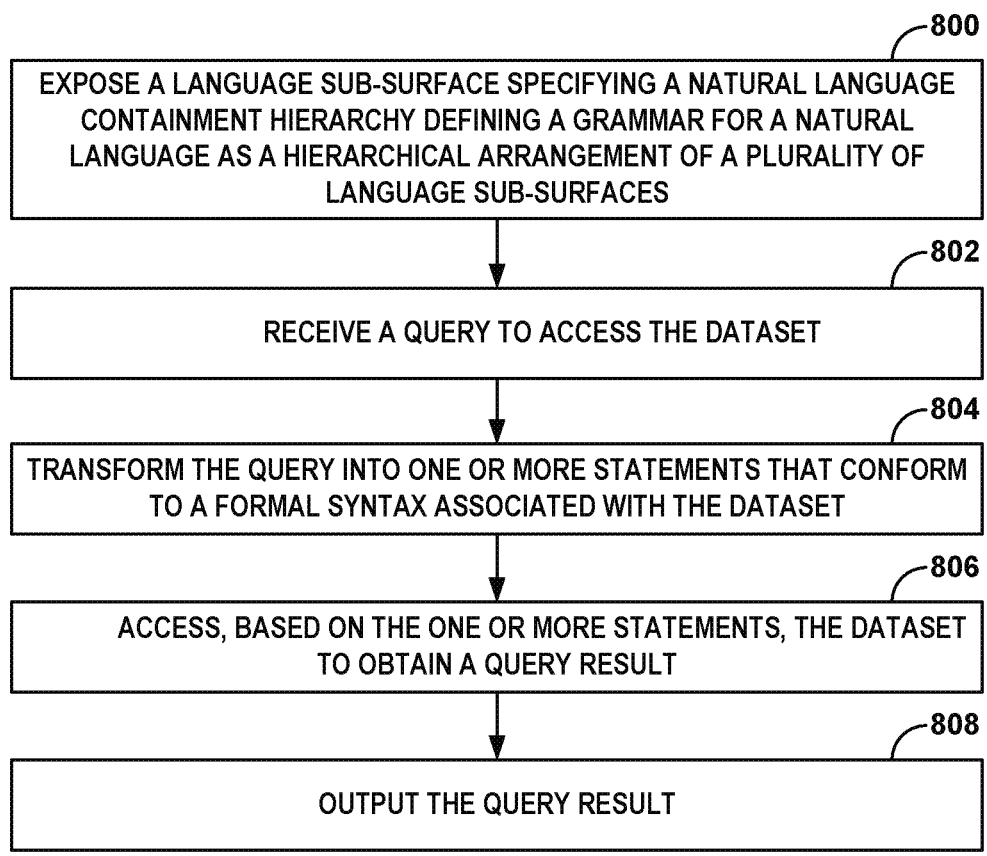
FIG. 6 is a flowchart illustrating example operation of the host device of FIG. 1 in performing various aspects of the techniques described in this disclosure.

FIG. 6 is a flowchart illustrating example operation of the host device of FIG. 1 in performing various aspects of the techniques described in this disclosure. Initially, CNLP unit 22 of host device 12 may expose a language sub-surface, e.g., language sub-surface 18A, specifying a natural language containment hierarchy defining a grammar for a natural language as a hierarchical arrangement of language sub-surfaces 18 (800). Server 28 of host device 12 may receive a query 19 via CNL sub-surface 18 exposed by CNLP unit 22 via interface 21 that includes a plain language request for data stored to databases 26. Such queries 19 may, in other words, request access to databases 26 so as to retrieve data stored to the databases 26 as a dataset. In this way, server 12 may receive a query 19 to access the dataset (802).

As noted above, such queries 26 may conform to a plain conversational language having various inputs that are translated, by CNLP unit 22, into intents 23. Server 28 may redirect intents 23 to execution platforms 24 that apply transformations to the intents 23 that transform intents 23 (representative of queries 19) into one or more statements 27 that conform to a formal syntax associated with the dataset stored to databases 26 (804). Execution platforms 24 may access, based on statements 27, the dataset stored to databases 27 to obtain a query result 29 providing portions of the dataset relevant to initial queries 19 (806). Execution platforms 24 may obtain query result 29 that execution platforms 24 may use when forming results 25. Execution platforms 24 may output query results 25 (808).

Figure 7:
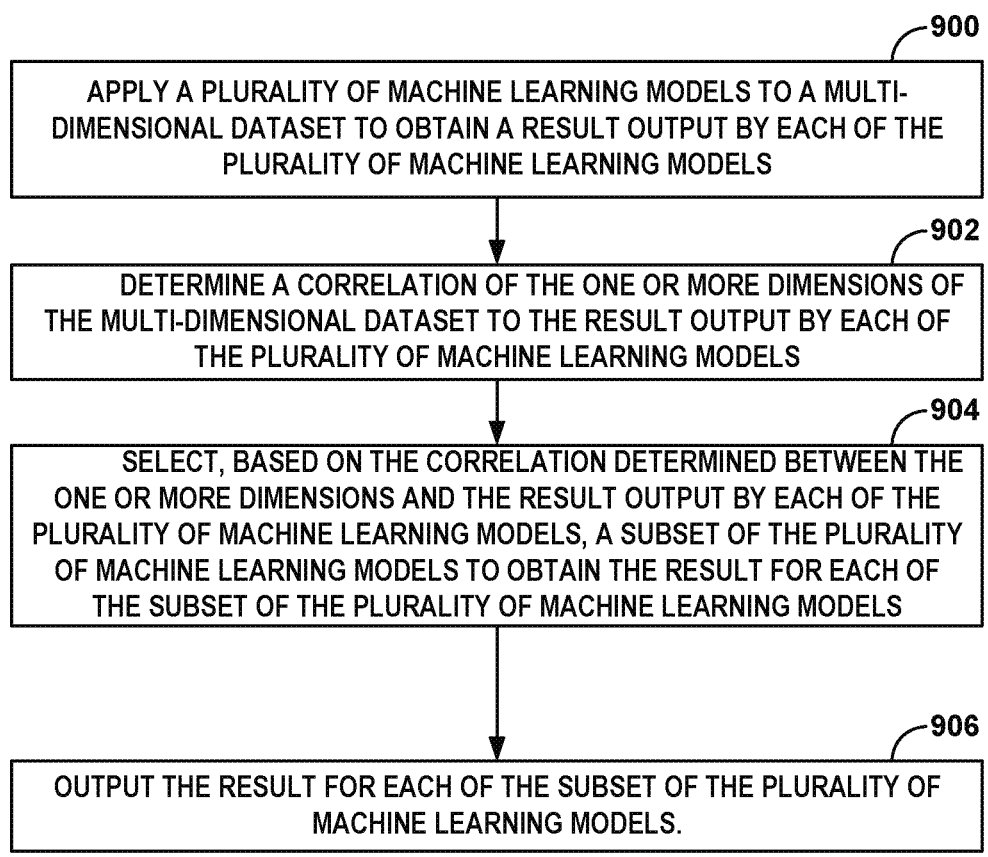
FIG. 7 is another flowchart illustrating example operation of the host device of FIG. 1 in performing additional aspects of the techniques described in this disclosure.

FIG. 7 is another flowchart illustrating example operation of the host device of FIG. 1 in performing additional aspects of the techniques described in this disclosure. As described above, execution platforms 24 of host device 12 apply a plurality of MLM 44 to a multi-dimensional dataset stored to databases 26 to obtain query results 29 output by each of the plurality of MLM 44 (900). Execution platforms 24 may next determine a correlation of one or more dimensions (e.g., a selected row or column) of the multi-dimensional datasets stored to databases 26 to query results 29—provided in response to transformed intents 23 (which are represented by statements 27)—output by MLM 44 (902).

Execution platforms 24 may invoke multiple MLM 44 responsive to intents 23 (or transformed intents 23 represented by statements 27) that analyze query results 29 resulting from accessing the datasets, based on statements 27, to obtain results 25. Execution platforms 24 may select, based on the correlation determine between the one or more dimensions and query result 29 output by each of the plurality of MLM 44, a subset of MLM 44 to obtain result 25 for each of the subset of the plurality of MLM 44 (904). Execution platforms 24 may output result 25 for each of the one or more of MLM 44 to server 28, which may provide output result 25 via interface 21 (906).

In this way, various aspects of the techniques may enable the following examples.

Example 1A. A device configured to interpret a multi-dimensional dataset, the device comprising: a memory configured to store the multi-dimensional dataset; and one or more processors configured to: apply a plurality of machine learning models to the multi-dimensional dataset to obtain a result output by each of the plurality of machine learning models; determine a correlation of one or more dimensions of the multi-dimensional dataset to the results output by each of the plurality of machine learning models; select, based on the correlation determined between the one or more dimensions and the result output by each of the plurality of machine learning models, a subset of the plurality of machine learning models to obtain the result for each of the subset of the plurality of machine learning models; and output the result for each of the subset of the plurality of machine learning models.

Example 2A. The device of example 1A, wherein the one or more processors are configured to output the result as a sentence using plain language.

Example 3A. The device of any combination of examples 1A and 2A, wherein the one or more processors are configured to output the result for at least one of the subset of the plurality of machine learning models as a graph identifying a relevance of each of the one or more dimensions to the result for each of the subset of the plurality of machine learning models.

Example 4A. The device of example 3A, wherein the graph comprises an impact graph.

Example 5A. The device of any combination of examples 1A-4A, wherein the one or more processors are configured to output the result for each of the subset of the plurality of machine learning models as a graphical representation of a decision tree.

Example 6A. The device of any combination of examples 1A-5A, wherein the one or more processors are further configured to: determine, based on a comparison of the correlation determined between the one or more dimensions and the result output by each of the plurality of machine learning models to a relevance threshold, one or more low relevance dimensions of the multi-dimensional dataset that have low relevance to the result output by each of the plurality of machine learning models; and output an indication explaining that the one or more low relevance dimensions have low relevance to the result.

Example 7A. The device of example 6A, wherein the one or more processors are configured to output a sentence in plain language that explain the one or more low relevance dimensions having low relevance to the result.

Example 8A. The device of any combination of examples 1A-7A, wherein the one or more processors are further configured to refrain from transforming the one or more dimensions of the multi-dimensional dataset prior to application of the plurality of machine learning models.

Example 9A. The device of any combination of examples 1A-8A, wherein the one or more processors are further configured to: determine, based on the results for each of the one or more of the plurality of machine learning models, one or more of a plurality of charts to explain the corresponding result; rank the one or more of the plurality of charts to identify a highest ranked chart; select the highest ranked chart; and output the highest ranked chart as a visual chart.

Example 10A. The device of example 9A, wherein the one or more processors are further configured to: generate an explanation in plain language explaining a formulation of the visual chart; and output the explanation.

Example 11A. The device of any combination of examples 1A-10A, wherein the one or more processors are further configured to: generate a pipeline report explaining how the device produced the plurality of the machine learning models; and output the pipeline report.

Example 12A. A method of interpreting a multi-dimensional dataset, the method comprising: applying a plurality of machine learning models to the multi-dimensional dataset to obtain a result output by each of the plurality of machine learning models; determining a correlation of the one or more dimensions of the multi-dimensional dataset to the results output by each of the plurality of machine learning models; selecting, based on the correlation determined between the one or more dimensions and the result output by each of the plurality of machine learning models, a subset of the plurality of machine learning models to obtain the result for each of the subset of the plurality of machine learning models; and outputting the result for each of the subset of the plurality of machine learning models.

Example 13A. The method of example 12A, wherein outputting the result comprises outputting the result as a sentence using plain language.

Example 14A. The method of any combination of examples 12A and 13A, wherein outputting the result comprises outputting the result for at least one of the subset of the plurality of machine learning models as a graph identifying a relevance of each of the one or more dimensions to the result for each of the subset of the plurality of machine learning models.

Example 15A. The method of example 14A, wherein the graph comprises an impact graph.

Example 16A. The method of any combination of examples 12A-15A, wherein outputting the result comprises outputting the result for each of the subset of the plurality of machine learning models as a graphical representation of a decision tree.

Example 17A. The method of any combination of examples 12A-16A, further comprising: determining, based on a comparison of the correlation determined between the one or more dimensions and the result output by each of the plurality of machine learning models to a relevance threshold, one or more low relevance dimensions of the multi-dimensional dataset that have low relevance to the result output by each of the plurality of machine learning models; and outputting an indication explaining that the one or more low relevance dimensions have low relevance to the result.

Example 18A. The method of example 17A, wherein outputting the indication comprises outputting a sentence in plain language that explain the one or more low relevance dimensions having low relevance to the result.

Example 19A. The method of any combination of examples 12A-18A, further comprising refraining from transforming the one or more dimensions of the multi-dimensional dataset prior to application of the plurality of machine learning models.

Example 20A. The method of any combination of examples 12A-19A, further comprising: determining, based on the results for each of the one or more of the plurality of machine learning models, one or more of a plurality of charts to explain the corresponding result; ranking the one or more of the plurality of charts to identify a highest ranked chart; selecting the highest ranked chart; and outputting the highest ranked chart as a visual chart.

Example 21A. The method of example 20A, further comprising: generating an explanation in plain language explaining a formulation of the visual chart; and outputting the explanation.

Example 22A. The method of any combination of examples 12A-21A, further comprising: generating a pipeline report explaining how the device produced the plurality of the machine learning models; and outputting the pipeline report.

Example 23A. A non-transitory computer-readable storage medium storing instructions that, when executed, cause one or more processors to: apply a plurality of machine learning models to a multi-dimensional dataset to obtain a result output by each of the plurality of machine learning models; determine a correlation of the one or more dimensions of the multi-dimensional dataset to the result output by each of the plurality of machine learning models; select, based on the correlation determined between the one or more dimensions and the result output by each of the plurality of machine learning models, a subset of the plurality of machine learning models to obtain the result for each of the subset of the plurality of machine learning models; and output the result for each of the subset of the plurality of machine learning models.

Example 1B. A device configured to access a dataset, the device comprising: a memory configured to store the dataset; and one or more processors configured to: expose a language sub-surface specifying a natural language containment hierarchy defining a grammar for a natural language as a hierarchical arrangement of a plurality of language sub-surfaces; receive a query to access the dataset, the query conforming to a portion of the natural language provided by the exposed language sub-surface; transform the query into one or more statements that conform to a formal syntax associated with the dataset; access, based on the one or more statements, the dataset to obtain a query result; and output the query result.

Example 2B. The device of example 1B, wherein the one or more processors are configured to: receive the query that identifies one or more dimensions of the dataset to keep; transform the query into one or more select statements that conform to the formal syntax associated with the dataset; and access, based on the one or more select statements, the dataset to obtain the query result that includes the one or more dimensions of the dataset identified by the query.

Example 3B. The device of any combination of examples 1B and 2B, wherein the one or more processors are further configured to: receive an additional query to access the dataset, the additional query conforming to the portion of the language provided by the exposed language sub-surface and identifying a dimension in the dataset that is not present in the query result; determine that the identified dimension is not present in the query result; transform, the additional query into one or more additional statements that conform to the formal syntax; access, based on the one or more additional statements and responsive to determining that the identified dimension is not present in the query result, the dataset to obtain an additional query result; and output the additional query result along with an indication that the additional query result was obtained from the dataset rather than the query result.

Example 4B. The device of any combination of examples 1B-3B, wherein the dataset is a dataset of a plurality of datasets, wherein the one or more processors are further configured to: determine whether the query applies to multiple datasets of the plurality of datasets; and output, responsive to determining that the query applies to the multiple datasets of the plurality of datasets, an indication that the query applies to the multiple datasets.

Example 5B. The device of any combination of examples 1B-4B, wherein the query includes a multi-part query having multiple query statements, wherein the exposed language sub-surface removes ambiguity in defining the query such that the multiple query statements forming the multi-part query are definable in any order, and wherein the one or more processors are configured to transform the multi-part query into the same one or more statements regardless of the order in which the multiple query statements are defined to form the multi-part query.

Example 6B. The device of any combination of examples 1B-5B, wherein the dataset is a first dataset of a plurality of datasets, and wherein the one or more processors are further configured to: determine whether the query includes query statements that identify dimensions of a second dataset of the plurality of datasets; automatically join, responsive to determining that the query includes query statements that identify dimensions of the second dataset, the first dataset and the second dataset to obtain a joined dataset; and access, based on the one or more statements, the joined dataset to obtain the query result.

Example 7B. The device of any combination of examples 1B-6B, wherein the dataset is a dataset of a plurality of datasets, and wherein the one or more processors are further configured to: identify relationships between one or more dimensions of the plurality of datasets; generate a diagram illustrating the relationships between the one or more dimensions of the plurality of datasets; and output the diagram.

Example 8B. The device of any combination of examples 1B-7B, wherein the dataset is a dataset of a plurality of datasets, and wherein the one or more processors are further configured to: identify relationships between one or more dimensions of the plurality of datasets; generate, based on the identified relationships, a graph data structure having nodes representative of each of the plurality of datasets and edges representative of the relationships between the one or more dimensions of the plurality of datasets; traverse, based on the query, the graph data structure to identify a shortest path through the graph data structure by which to satisfy the query; automatically join the dataset and one or more additional datasets of the plurality of datasets identified along the shortest path to obtain a joined dataset; and access, based on the one or more statements, the joined dataset to obtain the query result.

Example 9B. The device of example 8B, wherein the one or more processors are further configured to: traverse, based on the query, the graph data structure to identify an additional path through the graph data structure that would satisfy the query; and output an indication identifying the additional path through the graph data structure.

Example 10B. The device of example 9B, wherein the indication is a link for a revised query that would result in traversing the additional path through the graph data structure.

Example 11B. The device of any combination of examples 1B-10B, wherein the formal syntax includes a structure query language syntax or a Pandas dataframe syntax.

Example 12B. A method of accessing a dataset, the method comprising: exposing a language sub-surface specifying a natural language containment hierarchy defining a grammar for a natural language as a hierarchical arrangement of a plurality of language sub-surfaces; receiving a query to access the dataset, the query conforming to a portion of the language provided by the exposed language sub-surface; transforming the query into one or more statements that conform to a formal syntax associated with the dataset; accessing, based on the one or more statements, the dataset to obtain a query result; and outputting the query result.

Example 13B. The method of example 12B, wherein receiving the query comprises receiving the query that identifies one or more dimensions of the dataset to keep, wherein transforming the query comprises transforming the query into one or more select statements that conform to the formal syntax associated with the dataset, and wherein accessing the dataset comprises accessing, based on the one or more select statements, the dataset to obtain the query result that includes the one or more dimensions of the dataset identified by the query.

Example 14B. The method of any combination of examples 12B and 13B, further comprising: receiving an additional query to access the dataset, the additional query conforming to the portion of the language provided by the exposed language sub-surface and identifying a dimension in the dataset that is not present in the query result; determining that the identified dimension is not present in the query result; transforming, the additional query into one or more additional statements that conform to the formal syntax; accessing, based on the one or more additional statements and responsive to determining that the identified dimension is not present in the query result, the dataset to obtain an additional query result; and outputting the additional query result along with an indication that the additional query result was obtained from the dataset rather than the query result.

Example 15B. The method of any combination of examples 12B-14B, wherein the dataset is a dataset of a plurality of datasets, and wherein the method further comprises: determining whether the query applies to multiple datasets of the plurality of datasets; and outputting, responsive to determining that the query applies to the multiple datasets of the plurality of datasets, an indication that the query applies to the multiple datasets.

Example 16B. The method of any combination of examples 12B-15B, wherein the query includes a multi-part query having multiple query statements, wherein the exposed language sub-surface removes ambiguity in defining the query such that the multiple query statements forming the multi-part query are definable in any order, and wherein transforming the query comprises transforming the multi-part query into the same one or more statements regardless of the order in which the multiple query statements are defined to form the multi-part query.

Example 17B. The method of any combination of examples 12B-16B, wherein the dataset is a first dataset of a plurality of datasets, and wherein the method further comprises: determining whether the query includes query statements that identify dimensions of a second dataset of the plurality of datasets; automatically joining, responsive to determining that the query includes query statements that identify dimensions of the second dataset, the first dataset and the second dataset to obtain a joined dataset; and accessing, based on the one or more statements, the joined dataset to obtain the query result.

Example 18B. The method of any combination of examples 12B-17B, wherein the dataset is a dataset of a plurality of datasets, and wherein the method further comprises: identifying relationships between one or more dimensions of the plurality of datasets; generating a diagram illustrating the relationships between the one or more dimensions of the plurality of datasets; and outputting the diagram.

Example 19B. The method of any combination of examples 12B-18B, wherein the dataset is a dataset of a plurality of datasets, and wherein the method further comprises: identifying relationships between one or more dimensions of the plurality of datasets; generating, based on the identified relationships, a graph data structure having nodes representative of each of the plurality of datasets and edges representative of the relationships between the one or more dimensions of the plurality of datasets; traversing, based on the query, the graph data structure to identify a shortest path through the graph data structure by which to satisfy the query; automatically joining the dataset and one or more additional datasets of the plurality of datasets identified along the shortest path to obtain a joined dataset; and accessing, based on the one or more statements, the joined dataset to obtain the query result.

Example 20B. The method of example 19B, further comprising: traversing, based on the query, the graph data structure to identify an additional path through the graph data structure that would satisfy the query; and outputting an indication identifying the additional path through the graph data structure.

Example 21B. The method of example 20B, wherein the indication is a link for a revised query that would result in traversing the additional path through the graph data structure.

Example 22B. The method of any combination of examples 12B-21B, wherein the formal syntax includes a structure query language syntax or a Pandas dataframe syntax.

Example 23B. A non-transitory computer-readable storage medium storing instructions that, when executed, cause one or more processors to: expose a language sub-surface specifying a natural language containment hierarchy defining a grammar for a natural language as a hierarchical arrangement of a plurality of language sub-surfaces; receive a query to access a dataset, the query conforming to a portion of the language provided by the exposed language sub-surface; transform the query into one or more statements that conform to a formal syntax associated with the dataset; access, based on the one or more statements, the dataset to obtain a query result; and output the query result.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the host device 12 may perform a method or otherwise comprise means to perform each step of the method for which the host device 12 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the host device 12 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A device configured to access a dataset, the device comprising:
   a memory configured to provide a formal database that stores the dataset, the formal database accessible via one or more statements that conform to a formal syntax defined by a database programming language; and
   one or more processors configured to:
      expose a language sub-surface specifying a natural language containment hierarchy defining a grammar for a natural language as a hierarchical arrangement of a plurality of language sub-surfaces to enable a conversational natural language dialogue with the device;
      receive a query to access the dataset stored to the formal database, the query conforming to a portion of the natural language provided by the exposed language sub-surface;
      transform, based on execution of one or more pattern parsers associated with the exposed language sub-surface, the query into the one or more statements that conform to the formal syntax associated with the formal database that stores the dataset, the one or more statements adhering to the formal syntax defined by the database programming language that is different than the portion of the natural language provided by the exposed language sub-surface;
      access, based on the one or more statements, the formal database that stores the dataset to obtain a query result; and
      output the query result; and
      wherein the query includes a multi-part query having multiple query statements, wherein the exposed language sub-surface removes ambiguity in defining the query such that the multiple query statements forming the multi-part query are definable in any order, and wherein the one or more processors are configured to transform, based on the execution of the one or more pattern parsers associated with the exposed language sub-surface, the multi-part query into the same one or more statements regardless of the order in which the multiple query statements are defined to form the multi-part query.

2. The device of claim 1, wherein the one or more processors are configured to:
   receive the query that identifies one or more dimensions of the dataset to keep;
   transform, based on the execution of one or more pattern parsers associated with the exposed language sub-surface, the query into one or more select statements that conform to the formal syntax defined by the database programming language; and
   access, based on the one or more select statements, the formal database that stores the dataset to obtain the query result that includes the one or more dimensions of the dataset identified by the query.

3. The device of claim 1, wherein the one or more processors are further configured to:

receive an additional query to access the dataset, the additional query conforming to the portion of the language provided by the exposed language sub-surface and identifying a dimension in the dataset that is not present in the query result;

determine that the identified dimension is not present in the query result;

transform, based on the execution of the one or more pattern parsers associated with the exposed language sub-surface, the additional query into one or more additional statements that conform to the formal syntax;

access, based on the one or more additional statements and responsive to determining that the identified dimension is not present in the query result, the formal database that stores the dataset to obtain an additional query result; and output the additional query result along with an indication that the additional query result was obtained from the dataset rather than the query result.

4. The device of claim 1, wherein the dataset is a dataset of a plurality of datasets, wherein the one or more processors are further configured to:

determine whether the query applies to multiple datasets of the plurality of datasets; and output, responsive to determining that the query applies to the multiple datasets of the plurality of datasets, an indication that the query applies to the multiple datasets.

5. The device of claim 1, wherein the dataset is a first dataset of a plurality of datasets, and wherein the one or more processors are further configured to:

determine whether the query includes query statements that identify dimensions of a second dataset of the plurality of datasets;

automatically join, responsive to determining that the query includes query statements that identify dimensions of the second dataset, the first dataset and the second dataset to obtain a joined dataset; and access, based on the one or more statements, the joined dataset to obtain the query result.

6. The device of claim 1, wherein the dataset is a dataset of a plurality of datasets, and wherein the one or more processors are further configured to:

identify relationships between one or more dimensions of the plurality of datasets;

generate a diagram illustrating the relationships between the one or more dimensions of the plurality of datasets; and output the diagram.

7. The device of claim 1, wherein the dataset is a dataset of a plurality of datasets, and wherein the one or more processors are further configured to:

identify relationships between one or more dimensions of the plurality of datasets;

generate, based on the identified relationships, a graph data structure having nodes representative of each of the plurality of datasets and edges representative of the relationships between the one or more dimensions of the plurality of datasets;

traverse, based on the query, the graph data structure to identify a shortest path through the graph data structure by which to satisfy the query;

automatically join the dataset and one or more additional datasets of the plurality of datasets identified along the shortest path to obtain a joined dataset; and access, based on the one or more statements, the joined dataset to obtain the query result.

8. The device of claim 7, wherein the one or more processors are further configured to:

traverse, based on the query, the graph data structure to identify an additional path through the graph data structure that would satisfy the query; and output an indication identifying the additional path through the graph data structure.

9. The device of claim 8, wherein the indication is a link for a revised query that would result in traversing the additional path through the graph data structure.

10. The device of claim 1, wherein the database programming language includes a structure query language syntax or a Pandas dataframe syntax.

11. A method of accessing a dataset, the method comprising:

providing a formal database that stores the dataset, the formal database accessible via one or more statements that conform to a formal syntax defined by a database programming language exposing a language sub-surface specifying a natural language containment hierarchy defining a grammar for a natural language as a hierarchical arrangement of a plurality of language sub-surfaces to enable a conversational natural language dialogue with a device hosting the hierarchical arrangement of the plurality of language sub-surfaces;

receiving a query to access the dataset, the query conforming to a portion of the language provided by the exposed language sub-surface;

transforming, based on execution of one or more pattern parsers associated with the exposed language sub-surface, the query into the one or more statements that conform to the formal syntax associated with the formal database that stores the dataset, the one or more statements adhering to the formal syntax defined by the database programming language that is different than the portion of the natural language provided by the exposed language sub-surface;

accessing, based on the one or more statements, the formal database that stores the dataset to obtain a query result; and outputting the query result; and wherein the query includes a multi-part query having multiple query statements, wherein the exposed language sub-surface removes ambiguity in defining the query such that the multiple query statements forming the multi-part query are definable in any order, and wherein transforming the query comprises transforming, based on the execution of the one or more pattern parsers associated with the exposed language sub-surface, the multi-part query into the same one or more statements regardless of the order in which the multiple query statements are defined to form the multi-part query.

12. The method of claim 11, wherein receiving the query comprises receiving the query that identifies one or more dimensions of the dataset to keep, wherein transforming the query comprises transforming, based on the execution of one or more pattern parsers associated with the exposed language sub-surface, the query into one or more select statements that conform to the formal syntax defined by the database programming language, and wherein accessing the dataset comprises accessing, based on the one or more select statements, the formal database that stores the dataset to obtain the query result that includes the one or more dimensions of the dataset identified by the query.

13. The method of claim 11, further comprising:

receiving an additional query to access the dataset, the additional query conforming to the portion of the language provided by the exposed language sub-surface and identifying a dimension in the dataset that is not present in the query result;

determining that the identified dimension is not present in the query result;

transforming, based on the execution of the one or more pattern parsers associated with the exposed language sub-surface, the additional query into one or more additional statements that conform to the formal syntax;

accessing, based on the one or more additional statements and responsive to determining that the identified dimension is not present in the query result, the formal database that stores the dataset to obtain an additional query result; and outputting the additional query result along with an indication that the additional query result was obtained from the dataset rather than the query result.

14. The method of claim 11, wherein the dataset is a dataset of a plurality of datasets, and wherein the method further comprises:

determining whether the query applies to multiple datasets of the plurality of datasets; and outputting, responsive to determining that the query applies to the multiple datasets of the plurality of datasets, an indication that the query applies to the multiple datasets.

15. The method of claim 11, wherein the dataset is a first dataset of a plurality of datasets, and wherein the method further comprises:

determining whether the query includes query statements that identify dimensions of a second dataset of the plurality of datasets;

automatically joining, responsive to determining that the query includes query statements that identify dimensions of the second dataset, the first dataset and the second dataset to obtain a joined dataset; and accessing, based on the one or more statements, the joined dataset to obtain the query result.

16. The method of claim 11, wherein the dataset is a dataset of a plurality of datasets, and wherein the method further comprises:

identifying relationships between one or more dimensions of the plurality of datasets;

generating a diagram illustrating the relationships between the one or more dimensions of the plurality of datasets; and outputting the diagram.

17. The method of claim 11, wherein the dataset is a dataset of a plurality of datasets, and wherein the method further comprises:

identifying relationships between one or more dimensions of the plurality of datasets;

generating, based on the identified relationships, a graph data structure having nodes representative of each of the plurality of datasets and edges representative of the relationships between the one or more dimensions of the plurality of datasets;

traversing, based on the query, the graph data structure to identify a shortest path through the graph data structure by which to satisfy the query;

automatically joining the dataset and one or more additional datasets of the plurality of datasets identified along the shortest path to obtain a joined dataset; and accessing, based on the one or more statements, the joined dataset to obtain the query result.

18. The method of claim 17, further comprising:

traversing, based on the query, the graph data structure to identify an additional path through the graph data structure that would satisfy the query; and outputting an indication identifying the additional path through the graph data structure.

19. The method of claim 18, wherein the indication is a link for a revised query that would result in traversing the additional path through the graph data structure.

20. The method of claim 11, wherein the database programming language includes a structure query language syntax or a Pandas data frame syntax.

21. A non-transitory computer-readable storage medium storing instructions that, when executed, cause one or more processors to:

provide a formal database that stores the dataset, the formal database accessible via one or more statements that conform to a formal syntax defined by a database programming language expose a language sub-surface specifying a natural language containment hierarchy defining a grammar for a natural language as a hierarchical arrangement of a plurality of language sub-surfaces to enable a conversational natural language dialogue with a device hosting the hierarchical arrangement of the plurality of language sub-surfaces; receive a query to access the dataset, the query conforming to a portion of the language provided by the exposed language sub-surface;

transform, based on execution of one or more pattern parsers associated with the exposed language sub-surface, the query into the one or more statements that conform to the formal syntax associated with the formal database that stores the dataset, the one or more statements adhering to the formal syntax defined by the database programming language that is different than the portion of the natural language provided by the exposed language sub-surface;

access, based on the one or more statements, the formal database that stores the dataset to obtain a query result; and output the query result; and wherein the query includes a multi-part query having multiple query statements, wherein the exposed language sub-surface removes ambiguity in defining the query such that the multiple query statements forming the multi-part query are definable in any order, and wherein transforming the query comprises transforming, based on the execution of the one or more pattern parsers associated with the exposed language sub-surface, the multi-part query into the same one or more statements regardless of the order in which the multiple query statements are defined to form the multi-part query.

* * * * *